United States Patent
Al-Farisi et al.

(10) Patent No.: US 12,399,297 B2
(45) Date of Patent: Aug. 26, 2025

(54) MORPHOLOGY DECODER TO PREDICT HETEROGENEOUS ROCK PERMEABILITY WITH MACHINE LEARNING GUIDED 3D VISION

(71) Applicants: Khalifa University of Science and Technology, Abu Dhabi (AE); Abu Dhabi National Oil Company, Abu Dhabi (AE); Abu Dhabi Company for Offshore Petroleum Operations Limited, Abu Dhabi (AE)

(72) Inventors: Omar Usama Abdul Latif Al-Farisi, Abu Dhabi (AE); TieJun Zhang, Abu Dhabi (AE); Djamel Ouzzane, Abu Dhabi (AE); Mohamed Sassi, Abu Dhabi (AE); Saoud Almehairbi, Abu Dhabi (AE); Ahmed Al-Riyami, Abu Dhabi (AE); Hamdan Al Hammadi, Abu Dhabi (AE); Khalil Ibrahim, Abu Dhabi (AE); Aikifa Raza, Abu Dhabi (AE)

(73) Assignees: Khalifa University of Science and Technology, Abu Dhabi (AE); Abu Dhabi National Oil Company, Abu Dhabi (AE); Abu Dhabi Company for Offshore Petroleum Operations Limited, Abu Dhabi (AE)

( * ) Notice: Subject to any disclaimer, the term of this patent is extended or adjusted under 35 U.S.C. 154(b) by 360 days.

(21) Appl. No.: 18/044,071

(22) PCT Filed: Sep. 10, 2021

(86) PCT No.: PCT/IB2021/058230
§ 371 (c)(1),
(2) Date: Mar. 3, 2023

(87) PCT Pub. No.: WO2022/053991
PCT Pub. Date: Mar. 17, 2022

(65) Prior Publication Data
US 2024/0012174 A1    Jan. 11, 2024

Related U.S. Application Data

(60) Provisional application No. 63/076,890, filed on Sep. 10, 2020.

(51) Int. Cl.
*G01V 11/00*    (2006.01)
*G06T 7/60*     (2017.01)

(52) U.S. Cl.
CPC ............. *G01V 11/002* (2013.01); *G06T 7/60* (2013.01); *G06T 2200/04* (2013.01); *G06T 2207/10088* (2013.01); *G06T 2207/30181* (2013.01)

(58) Field of Classification Search
CPC ..... G01V 11/002; G06T 7/60; G06T 2200/04; G06T 2207/10088; G06T 2207/30181; G01N 15/08; G01N 2015/0846
See application file for complete search history.

(56) References Cited

U.S. PATENT DOCUMENTS

| | | | | |
|---|---|---|---|---|
| 8,155,377 B2 * | 4/2012 | Dvorkin | ............... | G01N 23/046 382/154 |
| 8,909,508 B2 * | 12/2014 | Hurley | ...................... | G06T 7/11 703/10 |

(Continued)

FOREIGN PATENT DOCUMENTS

| | | | |
|---|---|---|---|
| CA | 2899955 | * | 9/2014 |
| CA | 3045806 | * | 6/2018 |

(Continued)

OTHER PUBLICATIONS

Wu et al.., "Seeing Permeability From Images: Fast Prediction with Convolutional Neural Networks", Science bulletin, 2018 (Year: 2018).*

(Continued)

*Primary Examiner* — Qian Yang
(74) *Attorney, Agent, or Firm* — Kilpatrick Townsend & Stockton LLP

(57) ABSTRACT

Methods and systems are disclosed to determine a permeability value and a permeability image of a rock. The process (Continued)

can include determining labeling of a 3D segment of a rock. The labeled segments can be determined using, for example, computer vision and machine learning and can be used to determine a grain size of a 3D rock segments. The grain size value can be used to determine a permeability value for the 3D rock segment. The permeability value of the 3D rock segment can be used to determine the heterogeneous permeability of the rock.

15 Claims, 25 Drawing Sheets

(56) References Cited

U.S. PATENT DOCUMENTS

| 2012/0197526 A1* | 8/2012 | Leyte Guerrero | G01N 23/04 |
| | | | 250/311 |
| 2021/0157116 A1* | 5/2021 | Mezghani | G01N 15/08 |

FOREIGN PATENT DOCUMENTS

| CN | 106202695 B | 4/2018 |
| CN | 105487121 B | 8/2018 |
| CN | 105891089 B | 10/2018 |
| CN | 110837132 A | 2/2020 |
| WO | WO 2015/153505 | * 10/2015 |

OTHER PUBLICATIONS

Howard et al., "Uncertainty Quantification in Image Segmentation for Image-Based Rock Physics in a Shaly-San Dstone", SCA2018-034 (Year: 2018).*
Application No. PCT/IB2021/058230 , International Search Report and Written Opinion, Mailed On Dec. 20, 2021, 10 pages.
Alqahtani et al., "Deep Learning Conbolutional Neural Networks to Predict Porous Media Properties;" SPE Asia Pacific Oil and Gas Conference and Exhibition, Society of Petroleum Engineers, 2018.
Armatas , "Determination of the Effects of the Pore Size Distribution and Pore Connectivity Distribution on the Pore Tortuosity and Diffusive Transport in Model Porous Networks", Chemical Engineering Science vol. 61, No. 14, Jul. 2006, pp. 4662-4675.
Bergen et al., "Machine Learning for Data-driven Discovery in Solid Earth Geoscience", Science, vol. 363, No. 6433, Mar. 22, 2019, 30 pages.
Caplan et al., "Decadal-scale Shifts in Soil Hydraulic Properties as Induced by Altered Precipitation", Science Advances vol. 5, No. 9, Sep. 11, 2019, pp. 1-9.
Chhatre et al., "Oral Presentation Given at the Annual Symposium of the Society of Core Analysts", vol. 27, 2017.
Plessis et al., "Advancing X-ray Micro Computed Tomography in Africa: Going Far, Together", Scientific African, 2019, pp. 1-13.
Dernaika et al., "Digital and Conventional Techniques to Study Permeability Heterogeneity in Complex Carbonate Rocks", Petrophysics vol. 59, No. 3, Jun. 2018.
Dillard et al., "Development of a Pore Network Simulation Model to Study Nonaqueous Phase Liquid Dissolution", Water Resources Research vol. 36, No. 2, Feb. 2000, pp. 439-454.
Al-Farisi et al., "Machine Learning for 3D Image Recognition to Determine Porosity andLithology of Heterogeneous Carbonate Rock," SPE Reservoir Characterisation and Simulation Conference and Exhibition, Society of Petroleum Engineers, Sep. 17-19, 2019, pp. 1-12.
Hatiboglu et al., "Lattice-boltzmann Simulation of Solvent Diffusion Into Oil-saturated Porous Media", Physical Review E 76, Dec. 13, 2007.
Langlois et al., "Permeability of Solid Foam: Effect of Pore Connections", Physical Review E 97, 053111, vol. 97, No. 5, May 31, 2018, 11 pages.
Li et al., "Pore-Scale Lattice Boltzmann Simulation of Oil-Water Flow in Carbonate Rock with Variable Wettability", Abu Dhabi International Petroleum Exhibition and Conference, Society of Petroleum Engineers, 2015.
Li et al., "Neural Network Modeling of In-Situ Fluid-filled Pore Size Distributions in Subsurface Shale Reservoirs Under Data Constraint", Neural Computing and Applications, 2019, pp. 1-19.
Mosser et al., "Reconstruction of three-dimensional porous media using generative adversarial neural networks", Physical Review E 96, 043309, Apr. 12, 2017, pp. 1-21.
Noe et al., "Boltzmann Generators: Sampling Equilibrium States of Many-body Systems With Deep Learning", Science vol. 365, No. 6457, Jul. 12, 2019, pp. 1-46.
Parmigiani et al., "Bubble Accumulation and Its Role in the Evolution of Magma Reservoirs in the Upper Crust", Nature vol. 532, Apr. 13, 2016, pp. 492-495.
Patzek et al., "Verification of a Complete Pore Network Simulator of Drainage and Imbibition," SPE/DOE Improved Oil Recovery Symposium, Society of Petroleum Engineers, 2001, pp. 144-156.
Al-Raoush et al., "Extraction of Physically Realistic Pore Network Properties From Three-dimensional Synchrotron X-ray Microtomography Images of Unconsolidated Porous Media Systems", Journal of Hydrology vol. 300, No. 1-4, Jan. 10, 2005, pp. 44-64.
Varfolomeev et al., "An Application of Deep Neural Networks for Segmentation of Microtomographic Images of Rock Samples", Computers vol. 8, No. 72, Sep. 24, 2019, pp. 1-21.
Wang et al., "Boosting Resolution and Recovering Texture of micro-CT Images with Deep Learning", School of Minerals and Energy Resources Engineering, 2019, pp. 1-43.
Wang et al., "Enhancing Resolution of Digital Rock Images With Super Resolution Convolutional Neural Networks", Journal of Petroleum Science and Engineering vol. 182, Nov. 2019, 15 pages.
Wu et al., "Seeing Permeability from Images: Fast Prediction with Convolutional Neural Networks", Science Bulletin vol. 63, No. 18, Sep. 11, 2018, 18 pages.
Zhao et al., "Lattice Boltzmann Simulation of Gas Flow and Permeability Prediction in Coal Fracture Networks", Journal of Natural Gas Science and Engineering vol. 53, May 1, 2018, pp. 153-162.

* cited by examiner

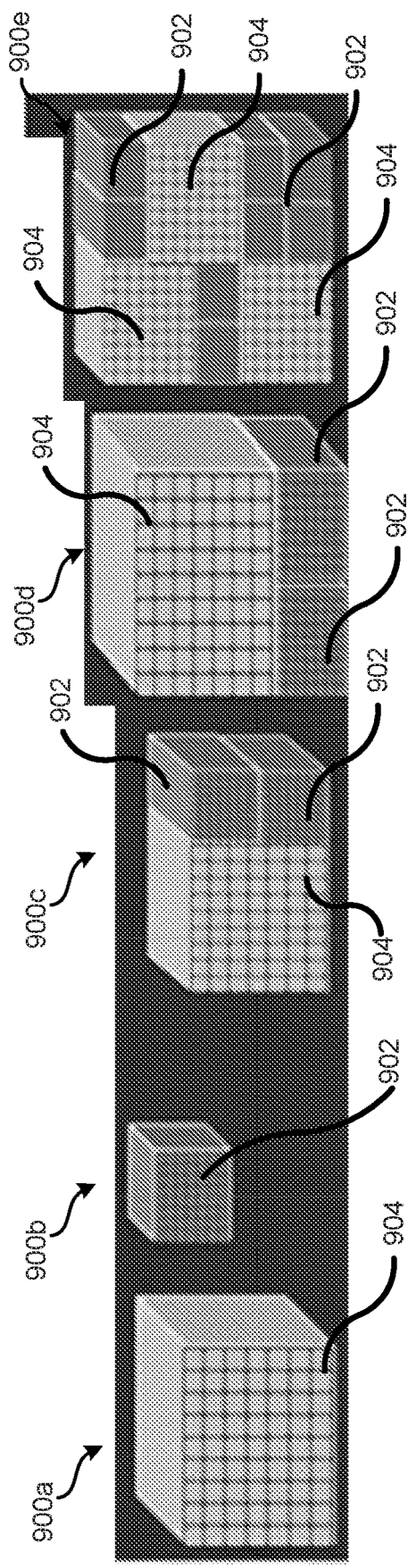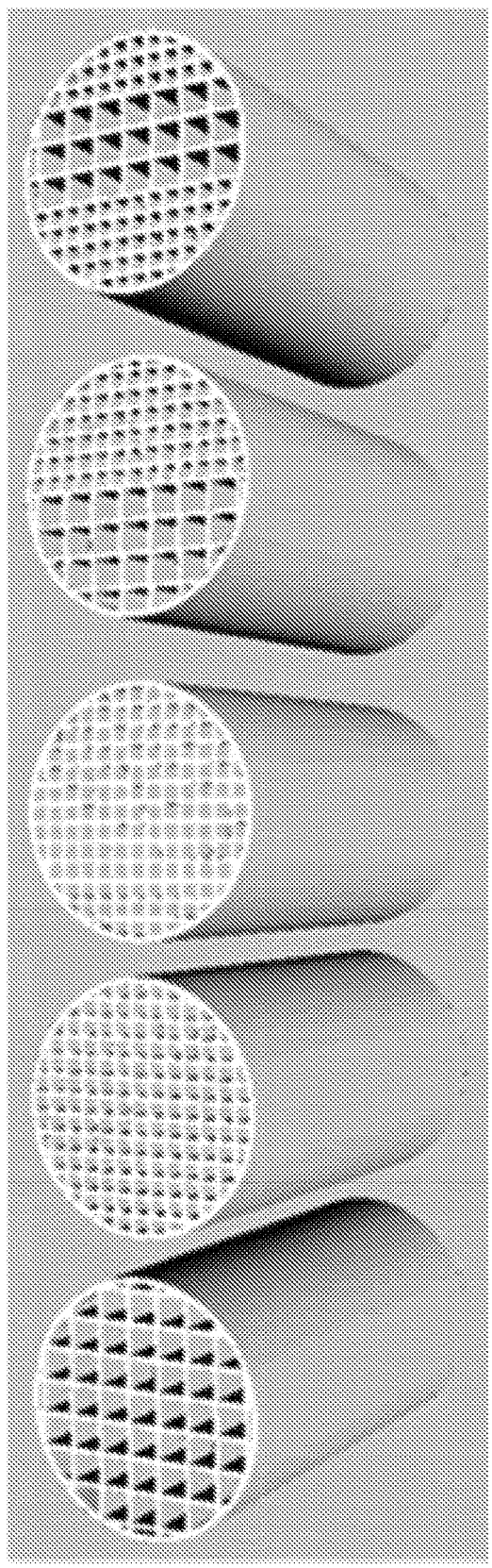
FIG. 9A
FIG. 9B

| k_Large (Darcy) Measured | K_Small (Darcy) Measured | K_Serial (Darcy) Predicted | K_Serial (Darcy) Measured | K(Darcy) Heterogenous Predicted | K(Darcy) Heterogenous Measured |
|---|---|---|---|---|---|
| 45.65 | 35.18 | 39.74 | 38.00 | 42.59 | 41.44 |

FIG. 9E

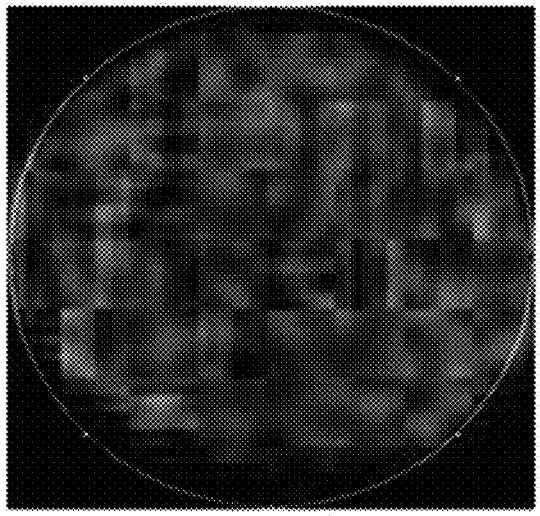
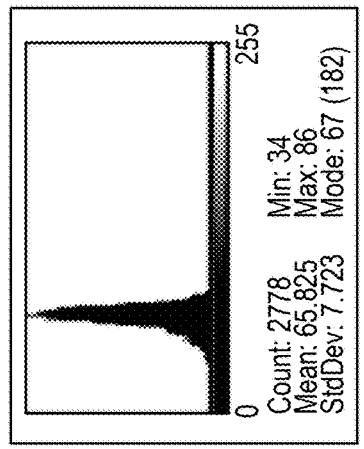
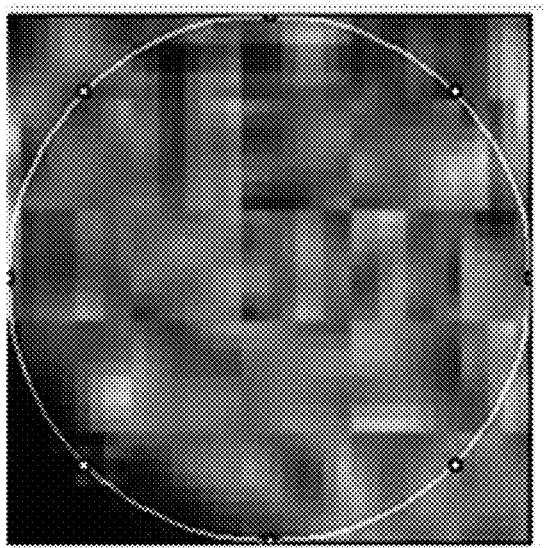
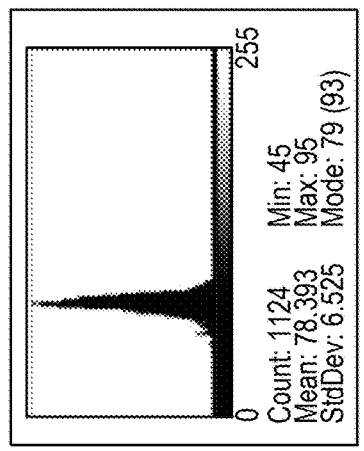
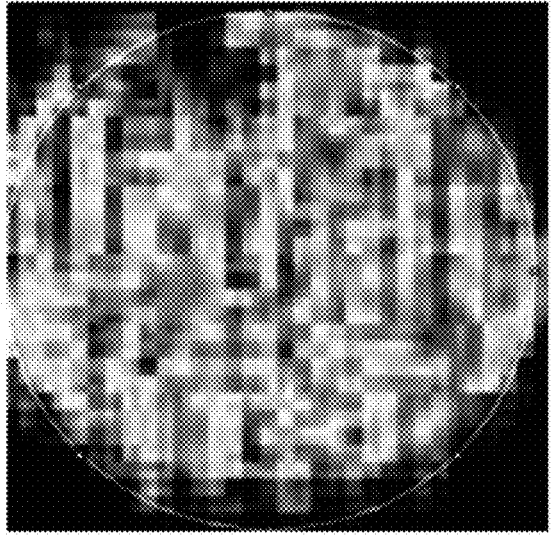
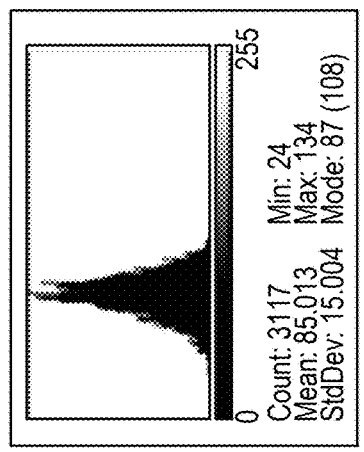
FIG. 12

MORPHOLOGY DECODER TO PREDICT HETEROGENEOUS ROCK PERMEABILITY WITH MACHINE LEARNING GUIDED 3D VISION

CROSS-REFERENCE TO RELATED APPLICATION

This application claims the benefit of and priority to U.S. Provisional Application No. 63/076,890, filed on Sep. 10, 2020, and titled "MORPHOLOGY DECODER TO PREDICT HETEROGENEOUS ROCK PERMEABILITY WITH MACHINE LEARNING GUIDED 3D VISION," the content of which is herein incorporated by reference in its entirety for all purposes.

BACKGROUND

Permeability influences flow properties of natural fluids through porous materials, for example rock. Direct numerical simulation, including Lattice Boltzmann method, has been used to model fluid flow through porous material. However, the use of simulations is limited due to high computation power needed when targeting better accuracy or using more massive data sets, and poor resolution of the images used for extracting the pore network. Deep learning-based computer vision can be used for modeling the fluid flow. However, the use of the convolutional neural network (CNN) algorithm has limited application in rock morphology analysis, due to insufficient image resolution for capturing the heterogeneity in 3D. For example, heterogeneous materials, such as Cretaceous carbonate, are too complicated for CNN to analyze.

BRIEF DESCRIPTION OF THE DRAWINGS

Various embodiments in accordance with the present disclosure will be described with reference to the drawings, in which:

FIG. 9A shows a conceptual model of a 3D porous media, according to various embodiments;

FIGS. 9B and 9C shows 3D models of the porous media for determining permeability, according to various embodiments;

FIG. 9E shows the comparison of the calculated permeability and the measured permeability of the porous media, according to various embodiments;

FIG. 12 shows MRI image intensity measurements of three sizes of glass beads, according to various embodiments;

DETAILED DESCRIPTION

Figure 1:
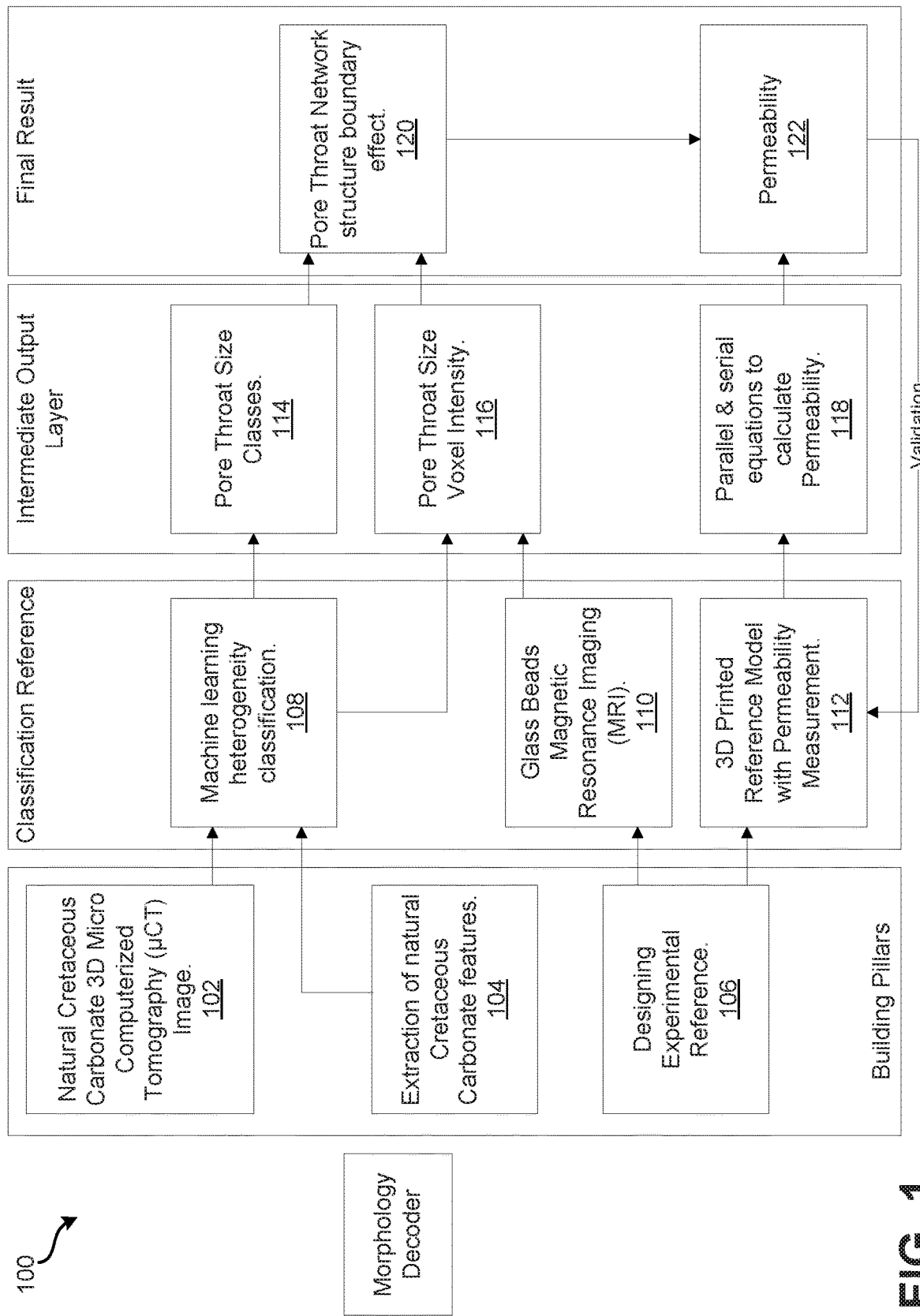
FIG. 1 illustrates a morphology decoder process, according to various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Geoscientists can simulate fluid flow through porous media morphology, using Lattice Boltzmann and other computational fluid dynamics simulation tools, making the results depend heavily on pore size, and pore connectivity. Three hindering challenges faced pore network Lattice Boltzmann and direct numerical simulators, induced errors due to various simulation assumptions, high computation power when targeting better accuracy or using more massive data set, and the resolution of the images used for extracting the pore network. Researchers have also used deep learning, specifically the convolutional neural network (CNN) algorithm. However, it is limited in application to 1D nuclear magnetic resonance data or 2D μCT images. A 2D image analysis of heterogeneous Cretaceous morphology produces a localized description and hence does not represent the whole 3D morphological structure. During testing four commercial computer vision vendors, for permeability determination using 2D vision, none of the vendors delivered acceptable permeability value. Recently, the use of CNN for pore size identification and permeability prediction from 3D μCT is noticeable; however, focusing on homogenous sandstone. On the contrary, Cretaceous carbonate is heterogeneous; it contains fossils (bioclast) and embeds diagenesis impacts in its texture. Carbonate heterogeneity made it complicated for CNN to analyze its morphology compared to sandstone.

Embodiments described herein can provide MRI or μCT real-time data Interpretation to produce rock permeability. This can be a wireline Logging Tool, Logging While Drilling and Logging While Casing or Logging While Coring. The technique also can be used for all MRI and μCT data acquired in laboratories. Embodiments described herein can also be applicable for Optical, Infrared, Ultraviolet, or any other measurement performed using any electromagnetic, sonic, ultrasonic, Nuclear, physical or chemical based measurement.

Disclosed is a method where MRI (Magnetic Resonance Imaging) can provide a permeability value and a permeability image of rock, for example, rock sections. Embodiments described herein can be or include a process that include experiments, machine learning, computer vision, geometrical analysis, 3D image objects properties recognition, and/or reconstruction.

Various embodiments described herein can include a Novel 3D Geometrical Permeability can be generated. A novel geometrical 3D permeability model can be generated that can enable quantifying natural rock permeability for some or all grain sizes of rhombohedral structural configuration. This permeability is referred to as $k_{3Drhombohedral}$.

Various embodiments described herein can include a Novel Machine Learning for 3D Properties Recognition of Carbonate Morphology. In some embodiments, the machine learning can include computer vision to detect various properties of the carbonate morphology. The machine learning can include building a geological labeling reference for X-ray micro-computed tomography (μCT) that can autonomously segment, segregate and label each rock section with the corresponding bioclast and grain size for 2D and 3D vision, guided by machine learning random forest difference of gaussian algorithm.

Various embodiments described herein can include a Novel 3D Vision Property Integration Model for Permeability. The 3D vision property integration model can innovate a new permeability aggregation process that can be used for 3D porous media vision using parallel and serial permeability equations to produce the general 3D permeability of the heterogeneous rock, $k_{HeC}$.

Various embodiments described herein can include a Novel MRI Permeability Imager. The MRI permeability Imager can innovate a new permeability imager refined with an MRI Image Intensity MRIII calibrator that can incorporate known grain size references (Glass Beads with various sizes) filled with crude oil.

Various embodiments described herein can include a Morphology Decoder. The morphology decoder can be or include a permeability determination process that integrates the 3D geometrical permeability, Machine learning, vision property integration model, and/or the MRI permeability imager. For example, the morphology decoder can be or include
  i. Step 1: use 3D images (MRI, μCT) as inputs to the machine learning to deliver an output of 3D rock segments based autonomously on a defined labeling set.
  ii. Step 2: use the output of Step 1 as an input for the MRI Permeability Imager to deliver an output of grain size value for each rock segment.
  iii. Step 3: use the output of Step 2 as an input for 3D Geometrical Permeability to deliver an output of permeability value, $k_{3Drhombohedral}$, for each segment.
  iv. Step 4: use the output of Step 3 as an input for the 3D Vision Property Integration Model for Permeability to deliver the rock 3D heterogeneous permeability, $k_{HeC}$.

Various embodiments described herein can include building 2D and 3D images MRI and μCT Wireline Logging Tool (WL), Logging While Drilling Tool (LWD), Logging While Coring (LWC) and Robots that process 2D and 3D vision using the 3D geometrical permeability, the machine learning, the 3D vision property integration model, the MRI permeability imager, and/or the morphology decoder to deliver the rock 3D heterogeneous permeability, $k_{HeC}$.

Turning to FIG. 1, a morphology Decoder process 100 (MorphD) is shown. The MorphD process can predict permeability of a material (e.g., cretaceous carbonate). For example, the MorphD can predict permeability using 3D vision. MorphD can additionally or alternatively predict permeability of material using image processing (e.g., computer vision), machine learning, 3D printing, 3D μCT, and/or MRI vision. MorphD can build a pore throat network (PorThN) by segmenting 3D μCT intensity of comparable morphology using machine learning algorithms. The MorphD can identify, for example, with MRI intensity, the impact of pore throat size (PorTS) on the control volume boundary of a 3D segmented section. MorphD can include a Controllable-Measurable-Volume (CMV), for example, instead of a Representative Elemental Volume (REV) concept. MorphD can rebuild the 3D segmented sections to predict, without fluid flow simulation, the 3D permeability of the material. The 3D permeability can be predicted using two parallel and serial aggregation governing equations. MorphD can validate the equation's results with polymer-based 3D printed micromodel experiments.

The MorphD process 100 at step 102 can include generating a high resolution 3D micro-computerized tomography (μCT) image. μCT image can be the target of the machine learning guided image analysis for determining permeability. The MorphD process 100 at step 104 can further include extracting features from the μCT image and labeling them for the machine to learn from. The MorphD process 100 at step 106 can include calibrating the Magnetic Resonance Imaging (MRI) model for pore throat size determination. One or more types of 3D Micro Models (3DMM) can be generated. The process 100 at step 108 can include classifying Cretaceous carbonate to the desired group, for example, per human expert training labels. The process 100 at step 110 can include generating a Glass Beads 3D Micro Model (GB3DM). The GB3DM can provide reference of a pore throat size that can correspond to MRI image voxel intensity. The process 100 at step 112 can include generating a Printed Mesh 3D Micro Model (PM3DM). The PM3DM can produce the series and parallel governing equation verification for determining permeability for heterogeneous morphology. The process 100 at 114 can include a prediction of results of pore throat size classifications to calculate permeability. The pore throat size classifications can be predicted using machine learning. The pore throat size classification can be used as an input to calculate permeability. The process 100 at 116 can include determining voxel intensity. The voxel intensity can be another input to the calculation of permeability. The process 100 at 118 can include the governing equations for calculating 3D permeability. The process 100 at 120 can include calculating the structure boundary effect of the pore throat network. This can be or include the Controllable Measurable Volume (CMV). The structure boundary effect can represent a discrete permeability value of each classified morphology, for example, morphology inside the Cretaceous carbonate. The process 100 at 122 can include using the CMV and the governing equations to calculate the permeability.

Figure 2:
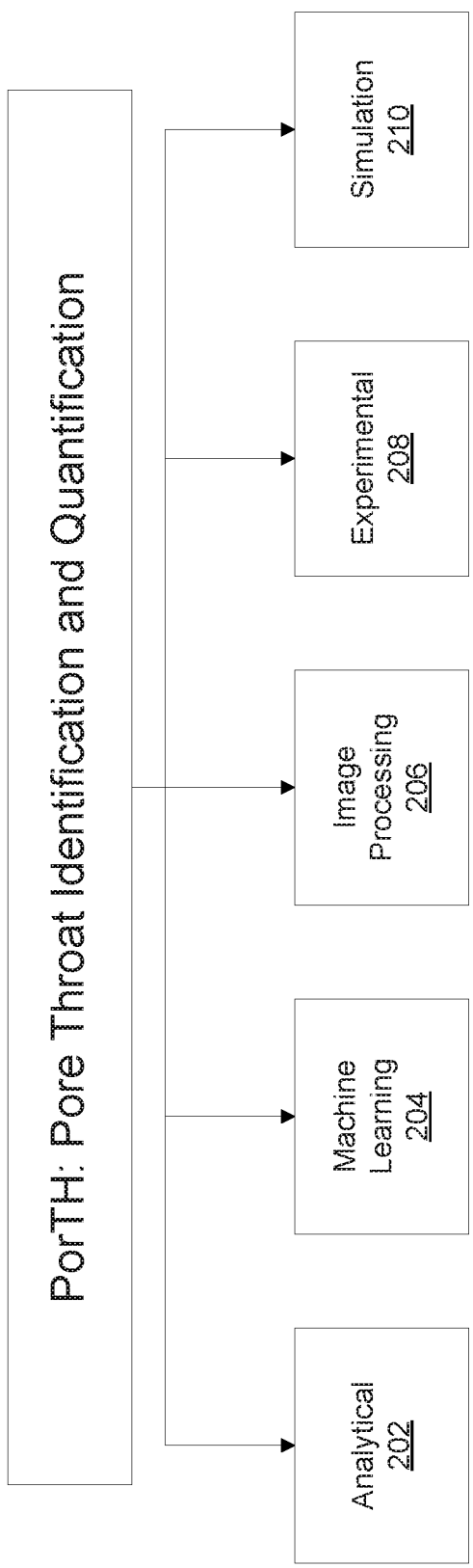
FIG. 2 illustrates a process for pore throat identification and quantification, according to various embodiments.

In homogenous texture, permeability can depend on PorTS, while in heterogeneous one, permeability may depend on the pore throat network. A pore throat network (PorThN) can include a heterogeneous texture that can contain multi-pore throat sizes that are distributed in a specific system to produce a unique morphology. There are various ways to identify pore throat sizes and PorThN. For example, pore throat sizes and PorThN can be identified using analytical, machine learning, image processing, experimental, and simulation (e.g., as shown in FIG. 2) In the analytical method 202, a geometrical analysis may be used. Machine learning 204 can provide an efficient and consistent quality process in segmenting a mass of 3D image data. Image processing 206 can ease the interpretation of machine learning outcomes to produce usable quantitative results. Experiments 208 can provide a calibration and validation assurance of our analytical, machine learning, and image processing approaches. Simulations 210 may be relied upon, however, this can make users dependent on simulations. To avoid the reliance on simulations the permeability can be quantified with MorphD.

The analytical path 202 can focus on the 2D and 3D geometrical analysis of objects. It can consist of describing the grain and the texture to determine PorTS and network. The process can start with a fundamental step of analyzing a homogenous geometry. Further complexities can be added to analyze heterogeneous morphology, which can contain more than one pore geometry. Finally, the learning can be used to analyze natural Cretaceous carbonate.

Figure 3:
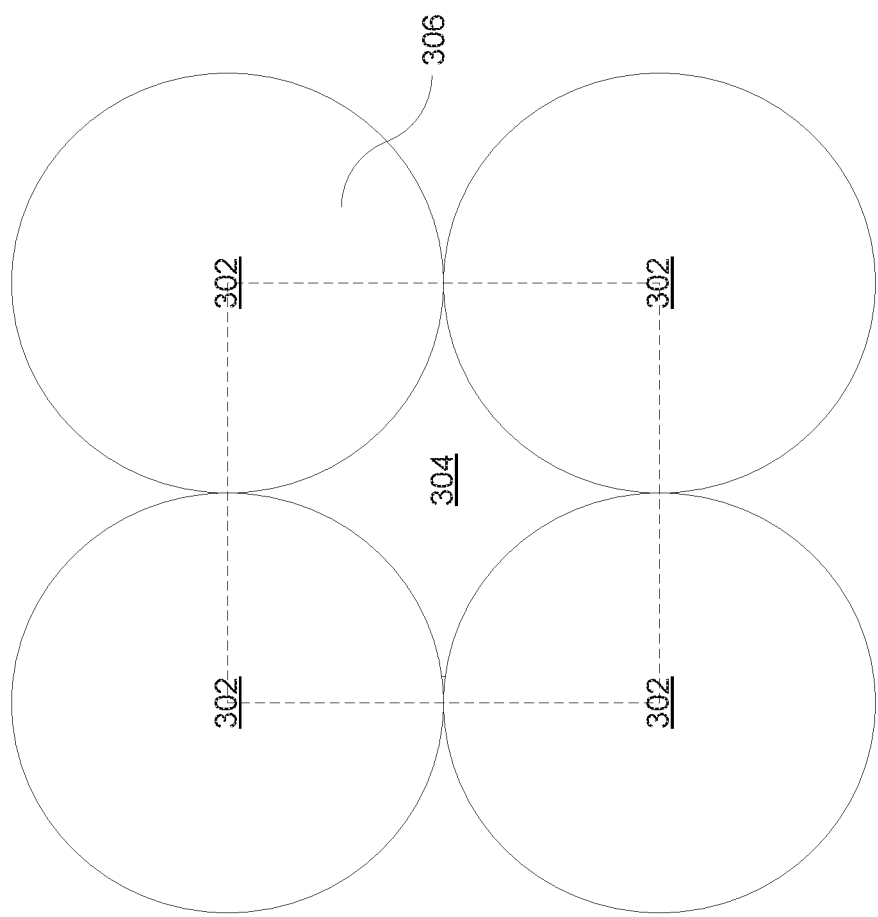
FIG. 3 shows a 2D projection of a porous system, according to various embodiments.

Intergranular and intragranular pores are two different geometrical systems that Cretaceous carbonate comprises. Homogenous cubic structure of well-sorted spherical grains can be displayed in 2D projection (e.g., as shown in FIG. 3). FIG. 3, shows that the edges of the circle can also be the edges of the pore throat. It can be determined that Axiom-0, a pore throat is a plane that can include enclosure from all directions. FIG. 3 shows a 2D projection of four spherical grains 302 representing one of the most homogeneous sphere-based configurations. The dashed square 306, which connects the centers of the circles 302, represents the largest perpendicular plane to the center of the four circles. This plane can act as the starting point for image processing. The dashed square 306 is in the X-Y plane, and the image analysis moves perpendicular to this plane. The dashed square 306 also represents the largest plane of the pore. The pore size is the square lateral, which is equivalent to a circle diameter. The pore throat 304 is the diamond shape in the middle of the grains 302. To imagine the shape between the dashed square 306 and the pore throat 304 in 3D, it is an arched pyramidal structure. The arched pyramid can have a square base, four sides that are one-eighth of a sphere, and a concaved diamond top.

The pore size area in 2D at the largest plane can be determined using the equation Pore Size Area=dashed square $306=4r_g^2$ where $r_g$ is the grain size (grain radius). The area of PorTS in 2D can be determined using PorTS=dashed square 306 area–Circle 302 area=$4r_g^2-\pi r_g^2=0.858r^2$. The relation between the area of the pore size and PorTS in 2D is the ratio between the two equations, as shown by $$\frac{\text{Pore Throat Size}}{\text{Pore Size}} = \frac{0.858 r_g^2}{4 r_g^2} = 0.2146.$$

The porous system in nature is of 3D configuration, not 2D and requires calculating the volume rather than the area.

Figure 4B:
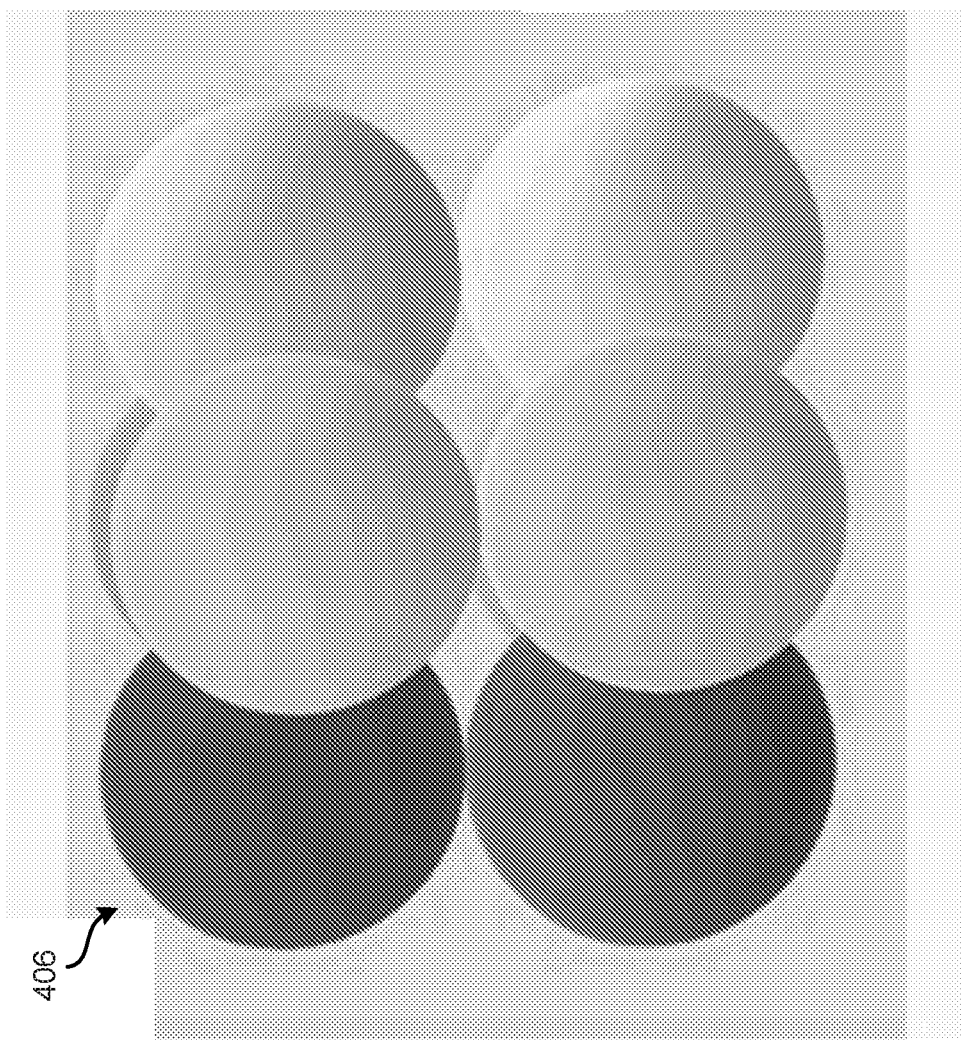
FIG. 4B shows eight spherical grains in 3D, according to various embodiments.
Figure 4A:
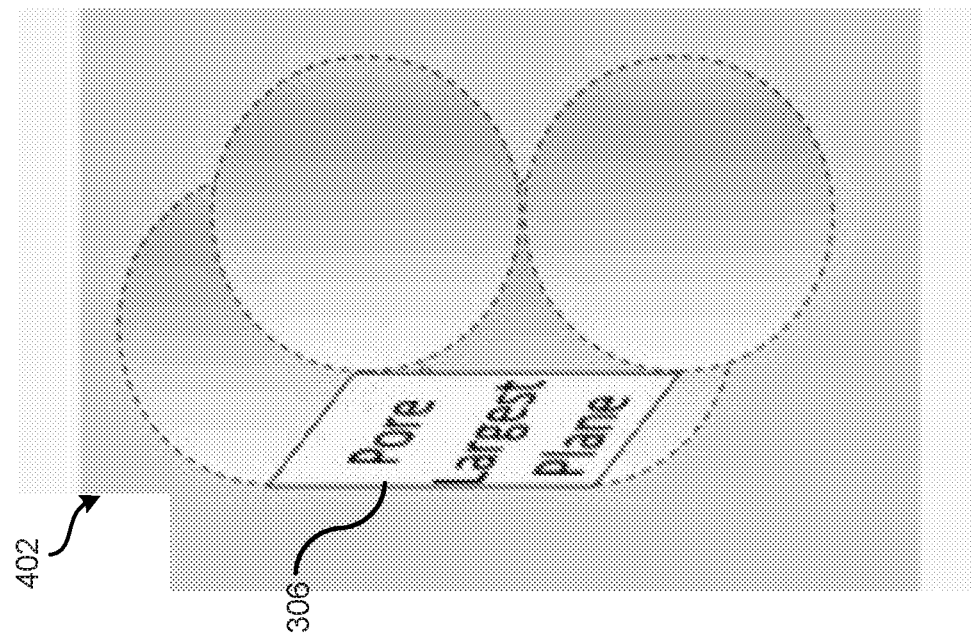
FIG. 4A shows the porous system of FIG. 3 in three-dimensions, according to various embodiments.
Figures 4C, 4D:
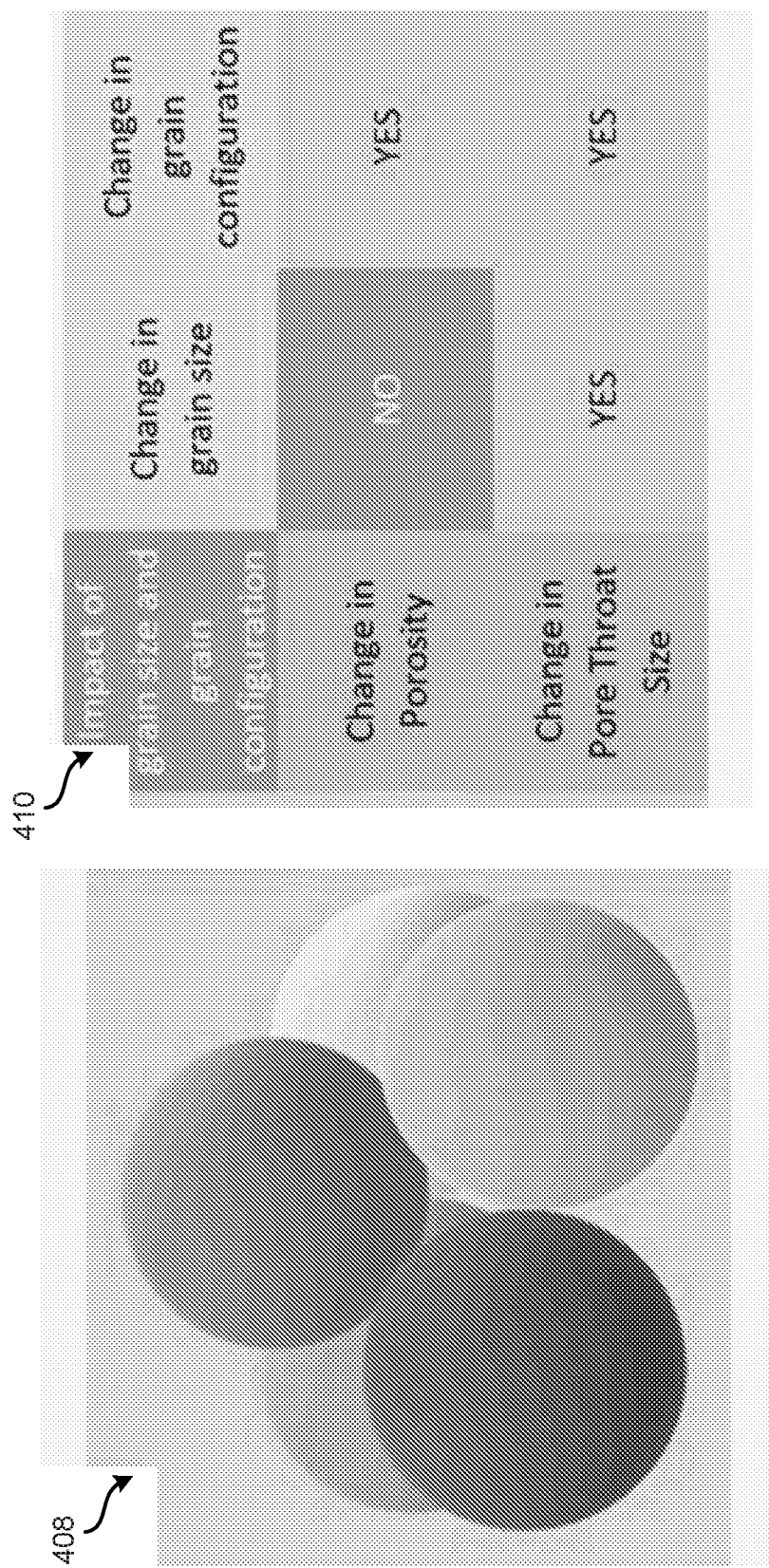
FIG. 4C shows a rhombohedral structure, according to various embodiments.
FIG. 4D shows a graph illustrating the impact of grain size and grain configuration on porosity and pore throat size, according to various embodiments.

FIGS. 4A through 4D show various configurations of spherical grains. FIG. 4A shows four spherical grains 402 in 3D which represent well-sorted configuration. The square 404 represents the pore size. Each square lateral is equivalent to the grain diameter. FIG. 4B shows eight spherical grains 406 which can represent a well-sorted cubic configuration. The cubic configuration may not represent natural grain distribution, however, it can still be used to analyze the geometrical equations, for example, before using the equations on a more complicated structure. FIG. 4C shows the rhombohedral structure 408 which can provide a closer representation of the original configuration of poorly sorted grains in nature. FIG. 4D shows a graph 410 which includes the impact of grain size and grain configuration on porosity and pore throat size.

FIG. 4A shows the porous system of FIG. 3, but in three dimensions. The full 3D representation of the pore and pore throat is shown in FIG. 4B. Porosity is the ratio of the void volume to the total bulk volume (void+solid) of an object, so it is dimensionless property (volume/volume). Porosity does not change with the change of the grain size. Still, it varies only with the grain configuration (i.e., sorting and compaction), which determines the transformation of the ratio between the void and the total bulk volume. The porosity of our Cretaceous sample ranges from 0.18 to 0.32. This range gives an average porosity of 0.25, for pore structure of rhombohedral configuration, as shown in FIG. 4C, it is also called rhombohedral-pyramidal (e.g., rhombohedral). The porosity value does not change with grain size change if the grain configuration remains the same, FIG. 4D. The PorTS changes with grain size change, FIG. 4D. In carbonate, porosity has not any proportional relation to PorTS. Therefore, for rock type classification, porosity has no direct relationship with the rock types, but this is not the case in clastics (Sand-Shale environment), where porosity can form direct relation to rock types. Also, in carbonate, the porosity has limited influence on fluid flow (i.e., permeability), while PorTS and PorThN have the dominant impact. While in clastics, the total porosity has limited relation to permeability, while the effective porosity has a significant impact on permeability. The total and effective porosity in carbonate is the same value due to the extremely limited or non-existence of shale in carbonate rock.

FIG. 4D shows the grain size can impact the pore throat radius. The grain size impacting the pore throat radius can also be shown by PorTS=dashed square 306 area–Circle 302 area=$4r_g^2-\pi r_g^2=0.858r_g^2$.

Figure 5A:
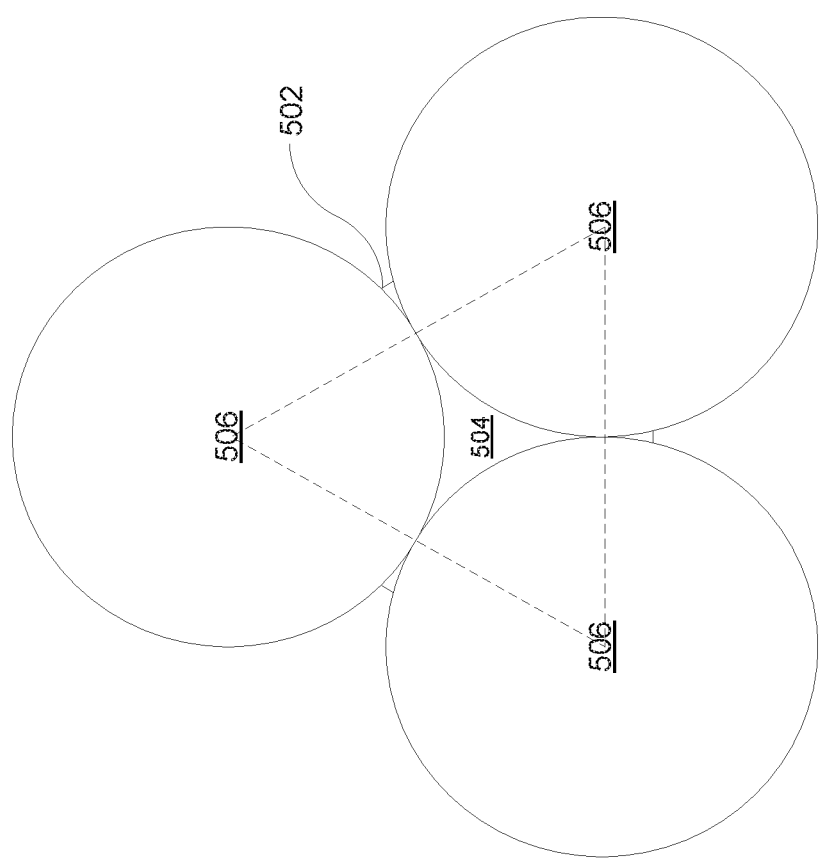
FIGS. 5A and 5B show a triclinic configuration of spherical grains, according to various embodiments.
Figure 5B:
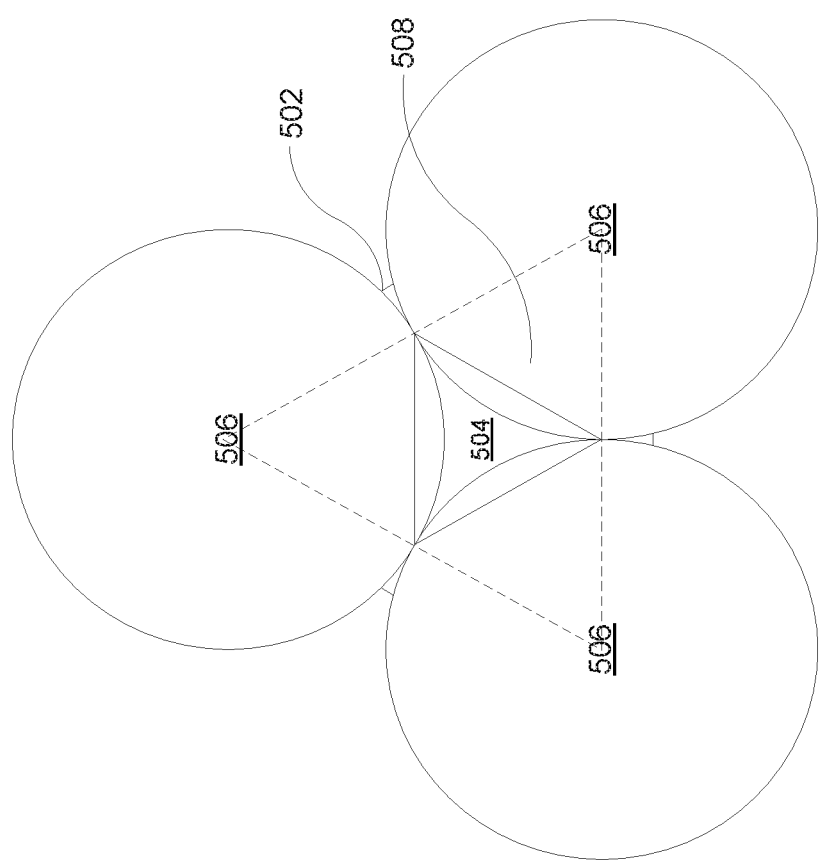

FIGS. 5A and 5B show a triclinic configuration of spherical grains. The dashed triangle 502 shows the pore size and the middle triangle 504 shows a pore throat area. Both the dashed triangle 502 and the middle triangle 504 depends on the size of the grain 506. However, porosity does not depend on the size of the grain 506 and instead depends on the configuration of the grain 506. FIG. 5B further shows triangle 508 that correlates to the triclinic configuration which can be used to derive the PorTS.

FIG. 5A shows a triclinic structure that is simpler than rhombohedral. A triclinic structure is a 2D illustration of three spheres. Pore size and PorTS can be determined by Pore Size=Area of Dashed triangle $$504 = \frac{\sqrt{3}}{4} r_g^2 \text{ and } PorTS_{Triclinic} = 4 *$$

the area of triangle 508–0.5*the area of the grain $$506 = 4\frac{\sqrt{3}}{4}r_g^2 - \frac{\pi}{2}r_g^2 = 0.162r_g^2.$$

The PorTS$_{Triclinic}$ equation can represent a 2D PorTS$_{Triclinic}$. However, it may be desired to use a 3D rhombohedral configuration (as shown in FIG. 4C). The 3D rhombohedral can be more complex than the triclinic shown in FIG. 5A. The 3D cubic configuration of eight spheres shown in FIG. 4B can consist of six faces (e.g., top, bottom, and four slides). On each face, there can be a pore throat shape of concaved diamond, similar to the shape of 304 shown in FIG. 3. Using the equations, the 3D pore throat area of cubic configuration is the sum of six concaved diamonds areas can be equal to $5.148r_g^2$. The Effective 3D Pore Throat Size of cubic configuration $$(PorTS_{cubic3D_{Effective}} = \frac{A_{cubic_{PorT}}}{N_{PorT} * N_{C\forall_{inets}}}r_g^2 = \frac{5.148}{6*2}r_g^2 = 0.429r_g^2,$$

where $A_{cubic_{PorT}}$ is the area of all pore throats of cubic configuration, $N_{porT}$ is the number of pore throats in a 3D configuration, and $N_{C\forall_{inets}}$ is the number of outlets of the fluid flow control volume. The 3D triclinic configuration of eight spheres consists of six faces that can hold two different shapes of pore throats; the top, bottom, and two sides can hold a pore throat shape of a concaved diamond. The other two sides can hold a pore throat shape of a concaved triangle: two-pore throats per each side. Therefore, the 3D pore throat area of triclinic configuration is the sum of four concaved diamonds and four concaved triangles equal to $4.08r_g^2$. The Effective 3D Pore Throat Size of triclinic configuration $$\left(PorTS_{cubic3D_{Effective}}\right)$$

can be shown as $$PorTS_{cubic3D_{Effective}} = \frac{A_{triclinic_{PorT}}}{N_{PorT} * N_{C\forall_{inets}}}r_g^2 = \frac{4.08}{8*2}r_g^2 = 0.255r_g^2$$

where $A_{triclinic_{PorT}}$ is the area of all pore throats for triclinic configuration.

The 3D rhombohedral configuration of eight spheres consists of six faces that hold two different shapes of pore throats; the top and bottom faces hold a pore throat shape of a concaved diamond. The four sides hold a pore throat shape of a concaved triangle: two-pore throats per each side. Therefore, the 3D pore throat area of rhombohedral configuration is the sum of two concaved diamonds and eight concaved triangle areas to be $1.71r_g^2$. The Effective 3D Pore Throat size of the Rhombohedral configuration $$\left(PorTS_{rhombohedral3D_{Effective}}\right)$$

can be solved for using $$PorTS_{rhombohedral3D_{Effective}} = \frac{A_{rhombohedral_{PorT}}}{N_{PorT} * N_{C\forall_{inets}}}r_g^2 = \frac{1.716}{10*2}r_g^2 = 0.0858r_g^2$$

where $A_{rhombohedral_{PorT}}$ is the pore throats area of rhombohedral configuration. The equation can be rewritten in terms of the grain surface area as $$PorTS_{rhombohedral3D_{Effective}} = A_{surface_{grain}} = 0.02731\ \pi r_g^2.$$

Permeability is a result of both grain size and grain configuration to form a proportional relation between permeability and grain surface area and can be used to create empirical equations for prediction of permeability.

$$\text{Permeability (mD)} = A_{surface_{grain}}(\mu m^2).$$

For 3D rhombohedral configuration, the permeability can be determined using $$k_{3D_{rhombohedral}} = PorTS_{rhombohedral3D_{Effective}} = 0.0858\ r_g^2.$$

Figure 6:
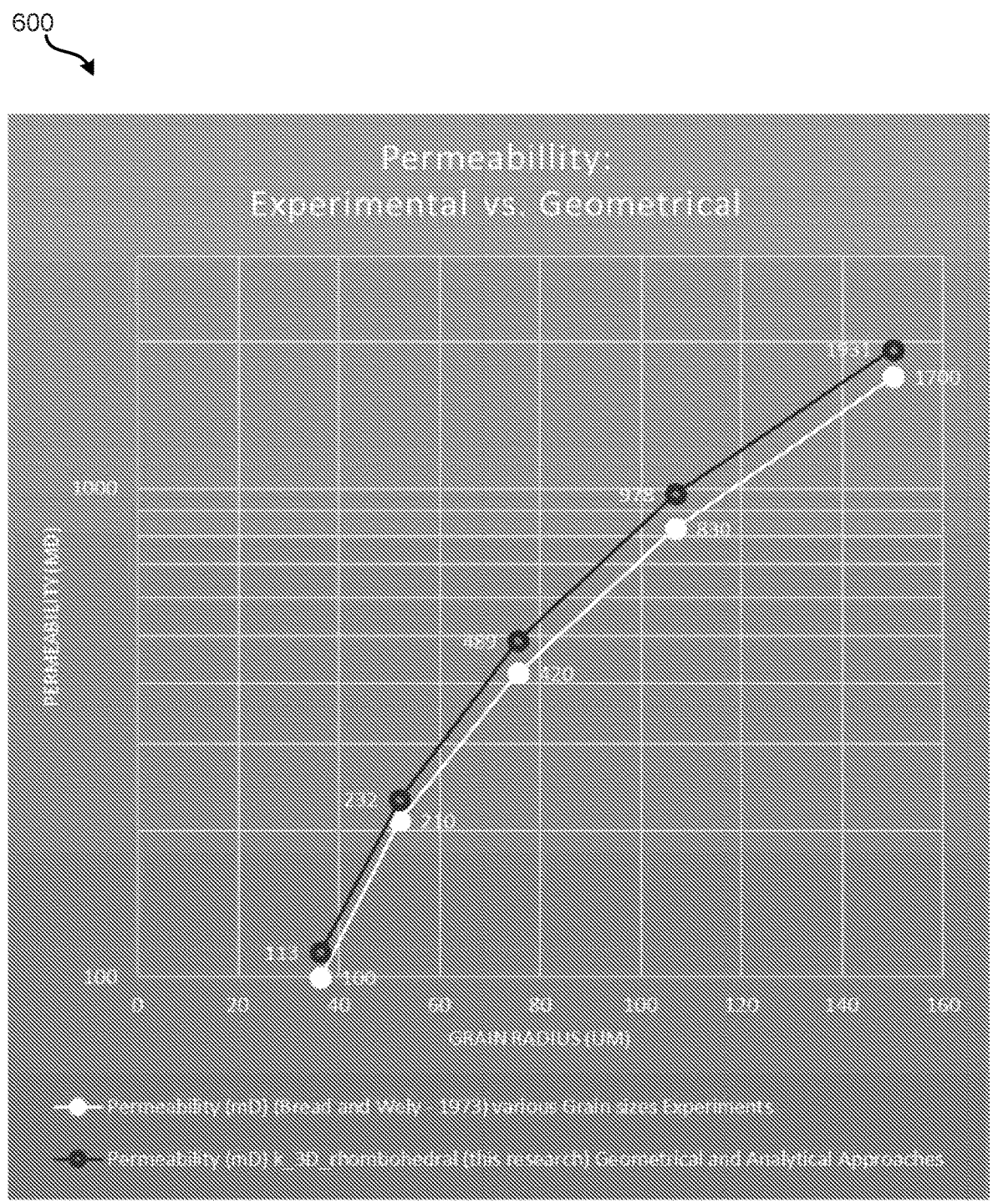
FIG. 6 shows a graph that compares the experimental permeability values with the calculated permeability, according to various embodiments.

FIG. 6 shows different sizes of grains and permeability with poorly sorted grains (rhombohedral). FIG. 6 shows a graph 600 that compares the experimental permeability values with the permeability determination for rhombohedral configuration using an analytical equation derived from grain radius.

Figure 7A:
FIGS. 7A through 7H show machine learning guided 3D properties recognition of natural rock morphologies, according to various embodiments.
Figure 7B:
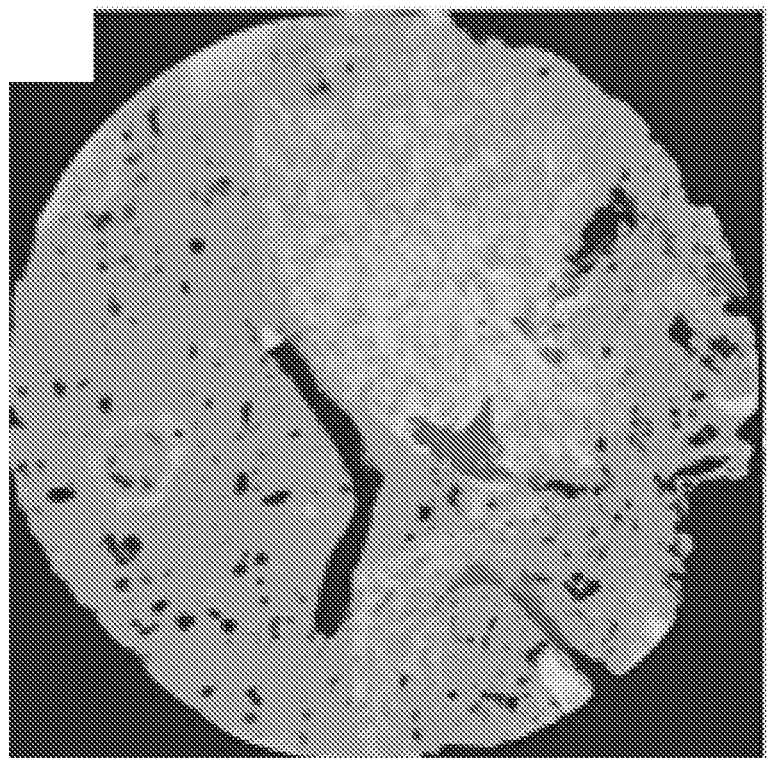
Figure 7C:
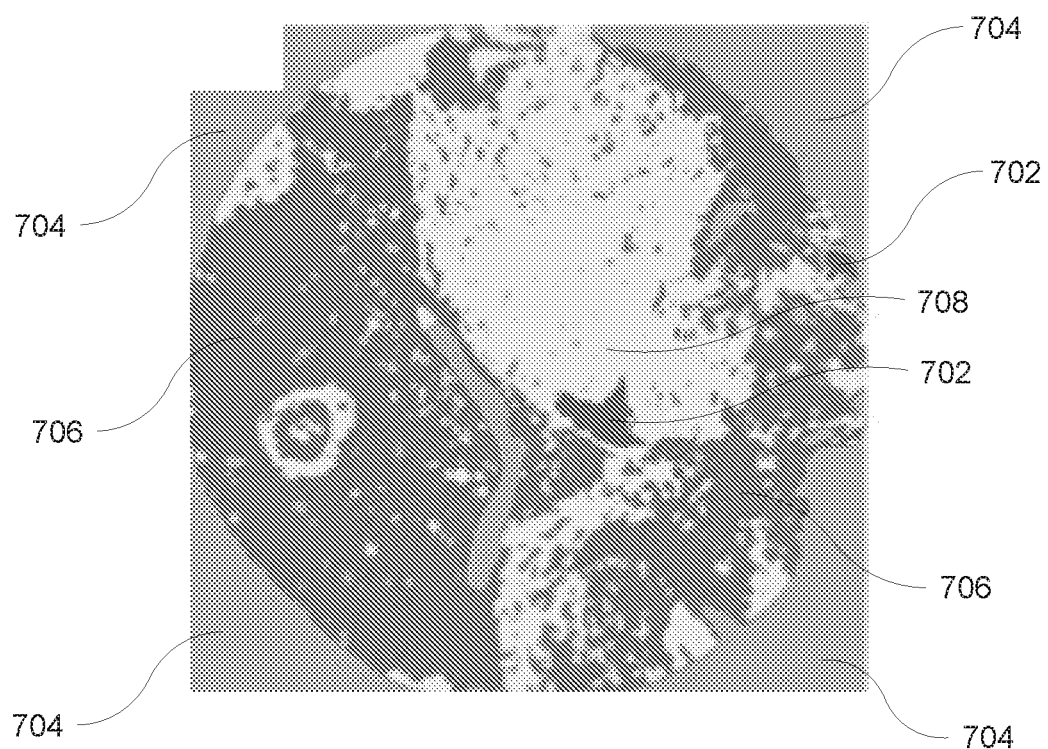
Figure 7D:
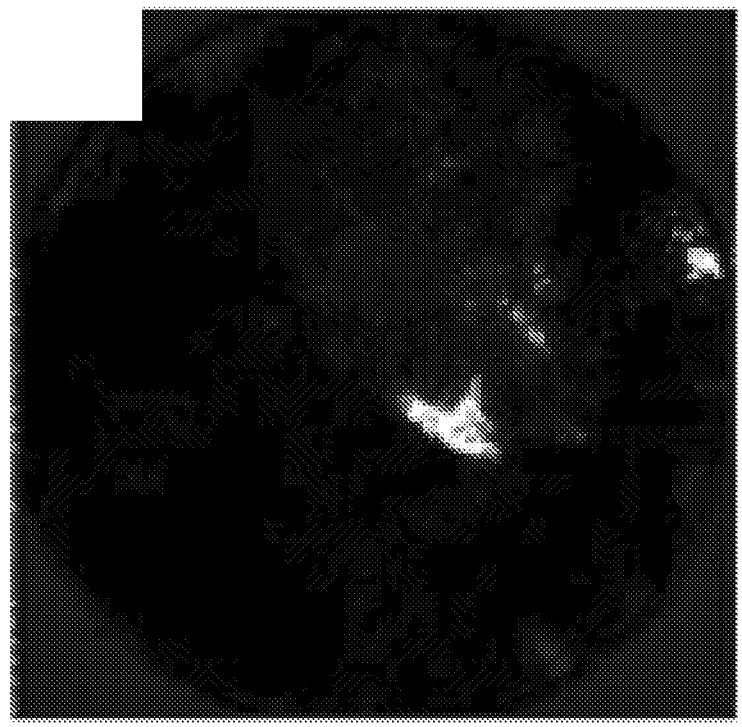
Figure 7E:
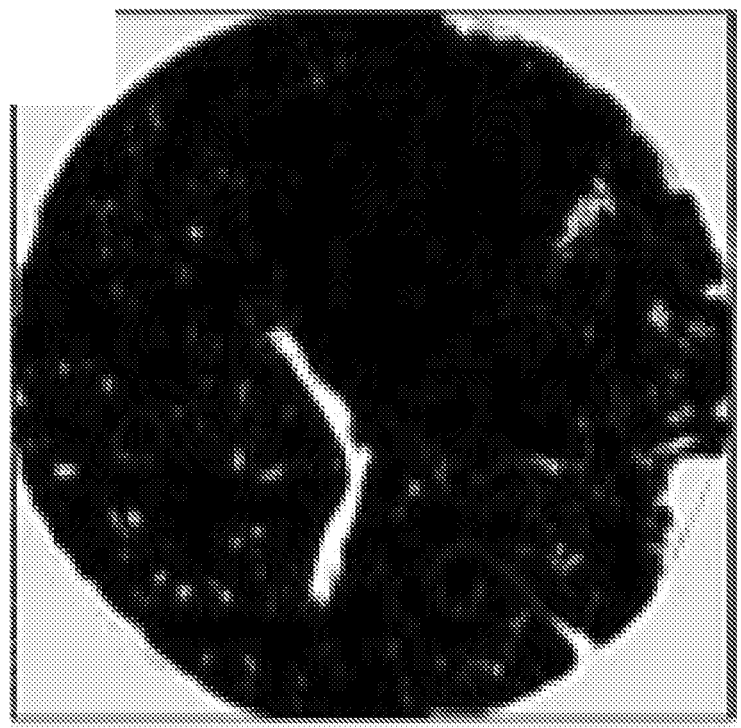
Figure 7F:
Figure 7G:
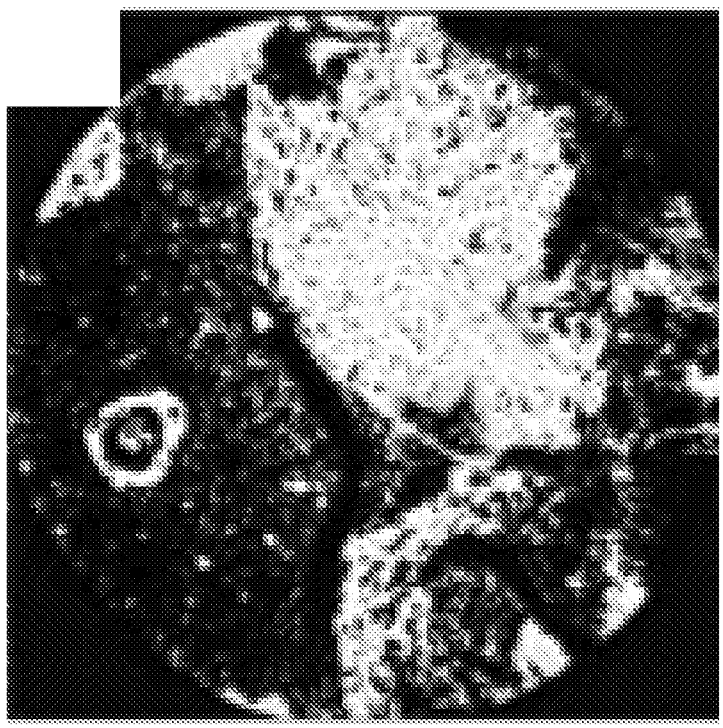
Figure 7H:
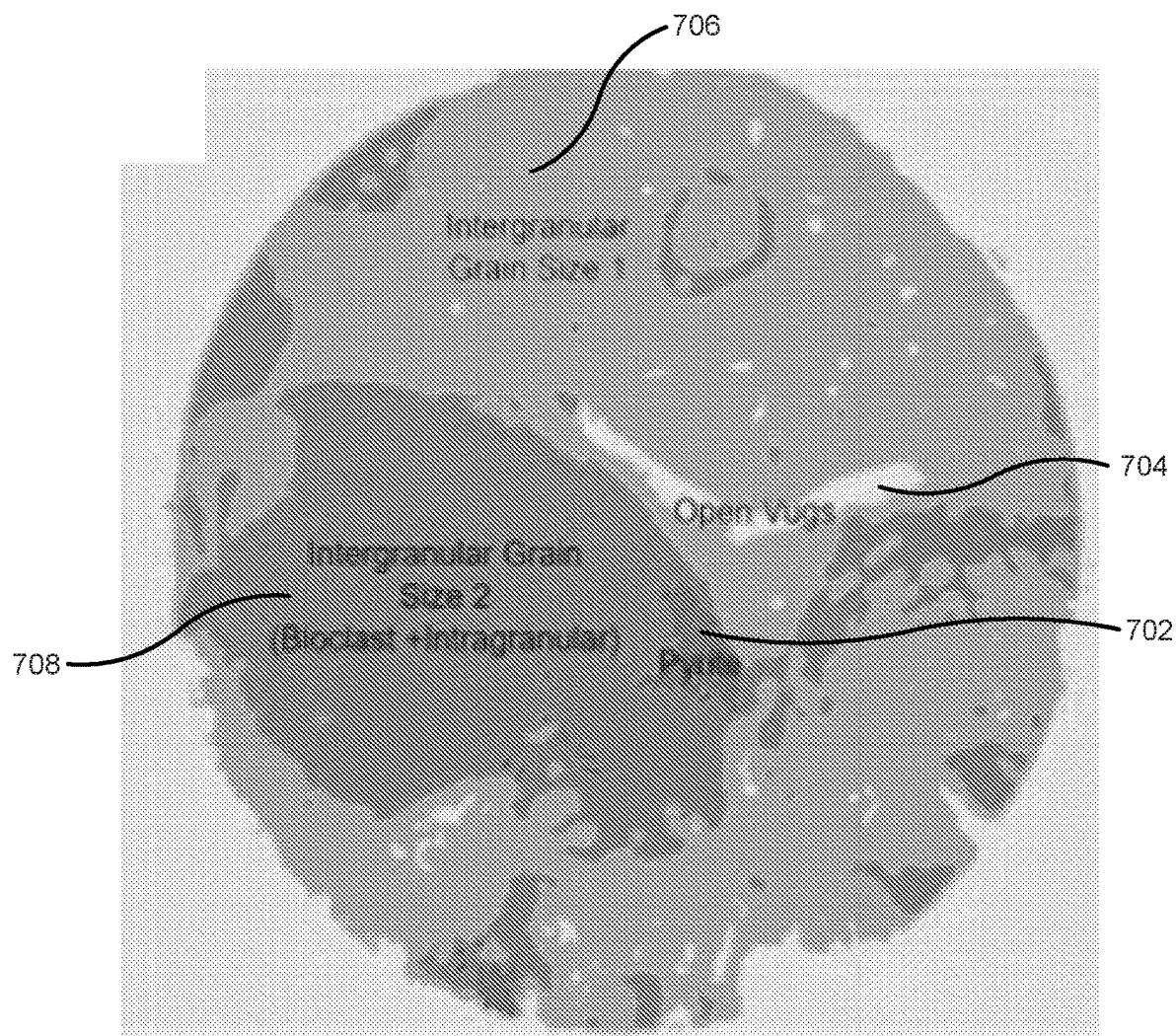

FIGS. 7A through 7H show machine learning guided 3D properties recognition of natural rock morphologies. FIG. 7A shows an original 3D μCT image with 28 um resolution, where gray shades represent different morphology. FIG. 7B shows the training outcome of the machine learning guided image processing to recognize the different zones in Cretaceous carbonate. Each different morphology has a different impact on the flow property of a natural fluid. Four differentiating heterogeneity zones (DHZ) that are recognized by the machine. Each of these DHZs volume boundaries becomes an attribute to define the controllable-measurable-volume (CMV) is used to reconstruct the rock for permeability determination. FIG. 7C shows the results of the machine learning segmentation of DHZs (D) DHZ of Pyrite are separated, as shown in white color shade. FIG. 7E shows the DHZ of Open Vugs is separated, as shown in white color shade. FIG. 7F shows the DHZ of Intergranular-1 is separated, as shown in the white color shade. FIG. 7G DHZ of Intergranular-2 is separated, as shown in white color shade. FIG. 7H shows the morphologies labeled with its corresponding DHZ.

The main morphology decoder deliverable is the permeability of heterogeneous Cretaceous rock ($k_{HeC}$). One of the cornerstones of morphology decoder for determining $k_{HeC}$ is $$k_{3D_{rhombohedral}} = PorTS_{rhombohedral3D_{Effective}} = 0.0858\ r_g^2.$$

Another critical cornerstone is differentiating heterogeneity zones (DHZ), where machine learning-based computer vision plays the role of determining DHZ, for classifying minerals with the 3D μCT images. In Cretaceous carbonate, more than one mineral exists, in our case, calcite and pyrite. FIG. 7A, shows the original μCT image with 28 um resolution. To identify DHZ, machine learning can be used with the Random Forest algorithm to perform image recognition of different rock sections. While FIG. 7B, shows the training image with four critical features—DHZs. The classification results are shown in FIG. 7C; with Pyrite 702, Open Vugs 704, Intergranular-1 706, and Intergranular-2 Bioclast 708. Each DHZ are separated volumetrically and geometrically as a discrete block to create the controllable-measurable-volume (CMV) as shown in FIG. 7D-G; Pyrite, Open Vugs, Intergranular-1, and Intergranular-2 Bioclast, respectively. Each CMV has a specific grain size that has a permeability value—$k_{3D_{rhombohedral}}$—that can be aggregated to produce Cretaceous rock permeability. FIG. 7H shows morphologies which can include Pyrite 702, Open Vugs 704, Intergranular-1 706, and Intergranular-2 Bioclast 708.

Figure 8A:
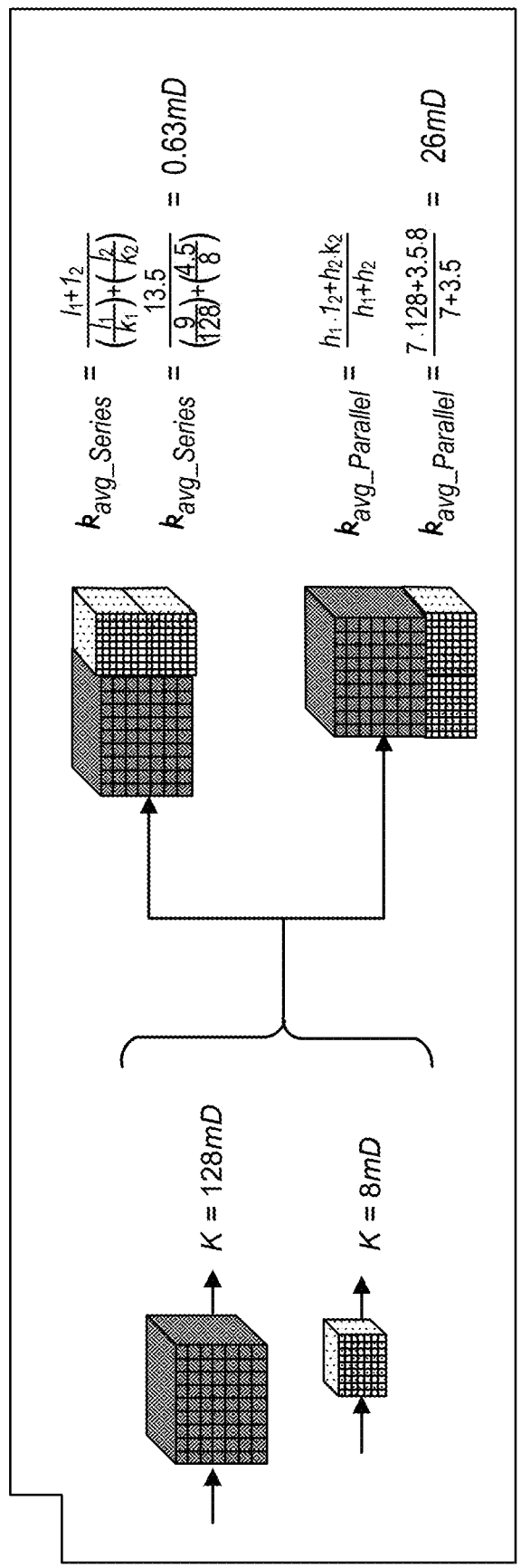
FIG. 8A shows examples of applying parallel and serial equations, according to various embodiments.
Figure 8B:
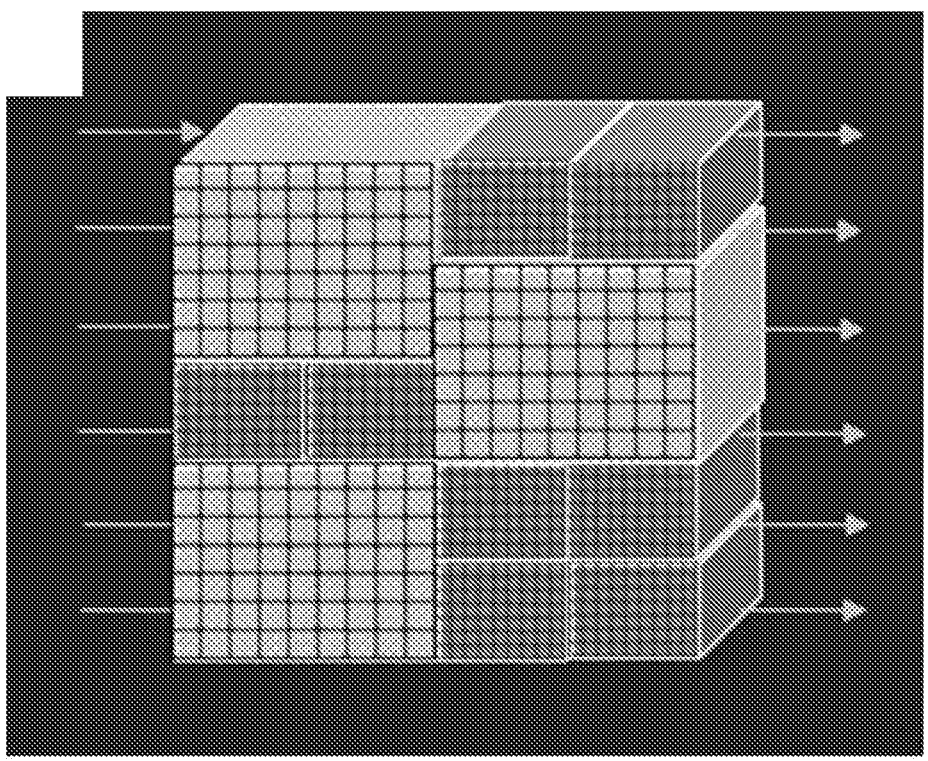
FIG. 8B shows a permeability model visualization, according to various embodiments.
Figure 8C:
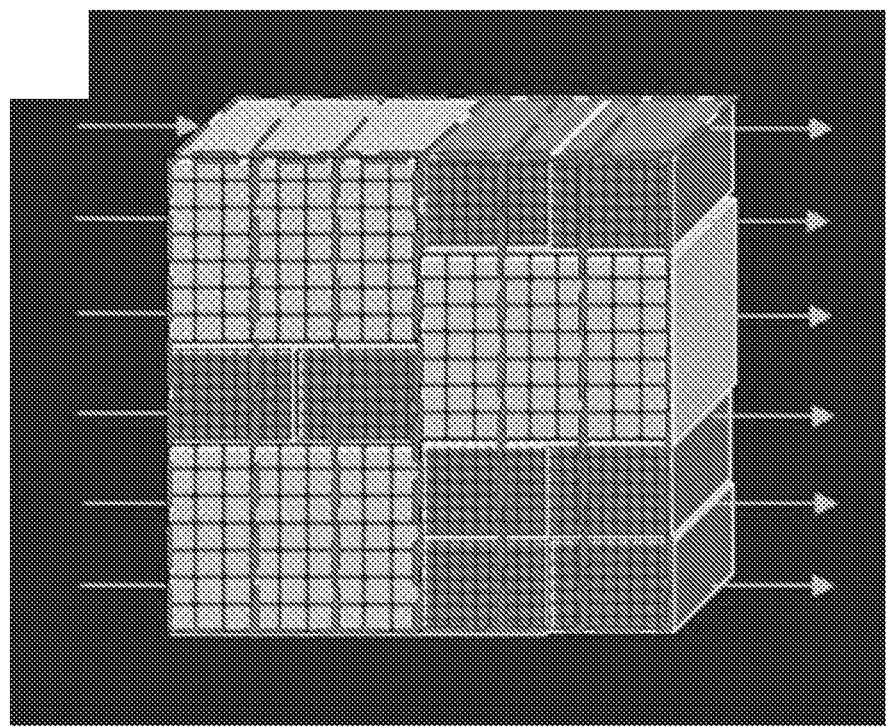
FIG. 8C shows a 3D permeability determination, according to various embodiments.

FIG. 8A shows multiple examples of applying parallel and serial equations. FIG. 8B shows a permeability Model visualization. FIG. 8C shows 3D Permeability determination based on control volumes that correspond to 2D slices of 3D image stacked in the z-axis As shown in FIG. 8A, the permeability can be aggregated using parallel and serial permeability using $$k_{avg_{serial}} = \frac{l_2 + l_2}{\left(\frac{l_1}{k_1}\right) + \left(\frac{l_2}{k_2}\right)} \text{ and } k_{avg_{parallel}} = \frac{h_1 k_1 + h_2 k_2}{h_1 + h_2}$$

where $l_1$, $l_2$ is the length of the section, $h_1$, $h_2$ is the height of the section, and $k_1$, $k_2$ is the permeability of each CMV. The permeability can be used to produce the general 3D permeability equation of the heterogeneous rock, $k_{HeC}$. This aggregation can be referred to as: 3D Property Integration Model (3DPIM). The steps for achieving 3DPIM starts keeping the flow direction (the arrows in FIG. 8B) perpendicular to the Control Volume ($C_V$) boundary. In the next step of 3DPIM, the permeability of each 2D slice (x-y plane) can be integrated using $$k_{avg_{parallel}} = \frac{h_1 k_1 + h_2 k_2}{h_1 + h_2}.$$

The last step of 3DPIM is the integration in z-axis direction for the 3D stack using the equation $$k_{avg_{serial}} = \frac{l_2 + l_2}{\left(\frac{l_1}{k_1}\right) + \left(\frac{l_2}{k_2}\right)}.$$

Figure 9C:
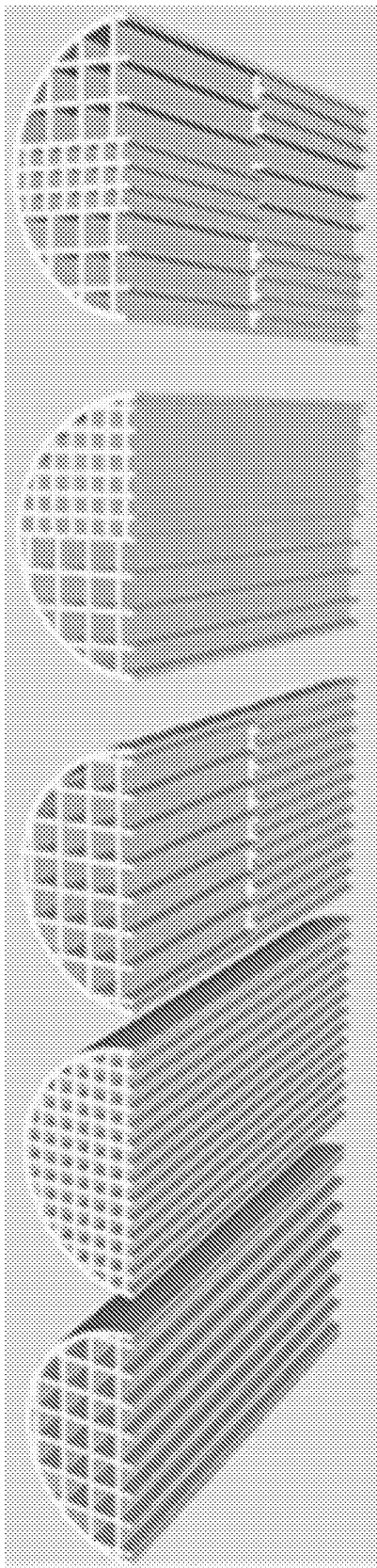
Figure 9D:
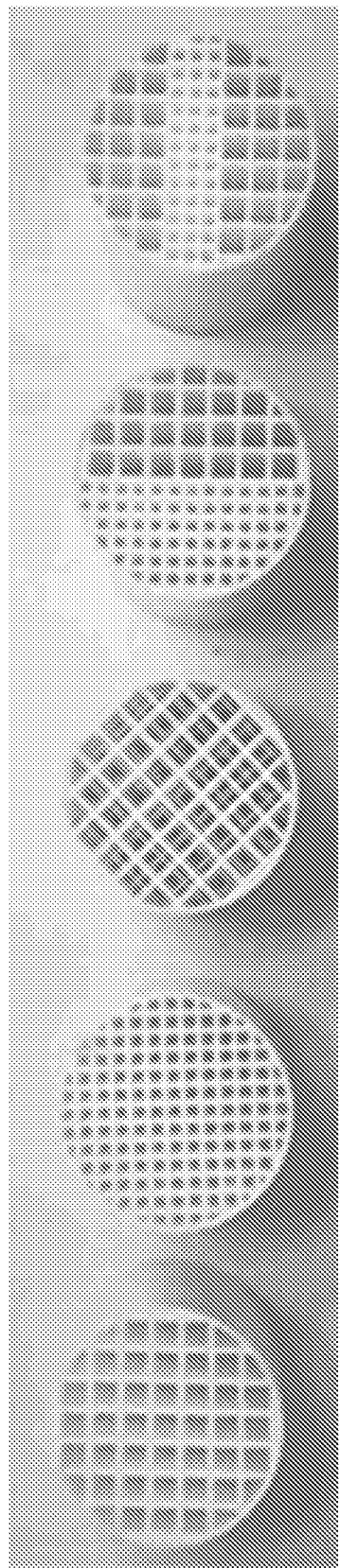
FIG. 9D shows a physical representation of the 3D models of FIGS. 9B and 9C, according to various embodiments.

Turning to FIG. 9A, conceptual models 900 of a 3D porous media (3DPM) are shown. Five different 3DPM configurations are shown, utilizing two mesh sizes (mesh inner laterals): 2000 um 902 and 4000 um 904. These configurations can reflect homogeneity and heterogeneity with two types of homogenous rocks—Samples 900a and 900b, one serial configuration of two homogenous rocks—Sample 900c, one parallel configuration of two homogenous rocks—Sample 900d, and heterogeneous rock of arbitrary distribution of two rock types—Sample 900e. The inner laterals sizes demonstrate a double difference in size, which can help differentiate the flow effects more accurately. The outer dimensions of 3DPM cylinders are 7.8 cm×3.8 cm (length×Diameter), a size that can fit the flooding apparatus for permeability measurement. The conceptual model had its final 3D drawing engineered with Computer-Aided Design (CAD) software, as shown in FIGS. 9B and 9C. 3DPM five cylinders can be 3D-printed with polymer material, to have the final physical look of the cylinders shown in FIG. 9D. The five 3DPM can be used for determining permeability by equipping each cylinder with rubber sleeve and injecting air at 35 psi (~241 KPa) sleeve conformance pressure. The conformance pressure can be equal to the maximum pressure that the 3DPM can hold before deformation occurs to the cylinders. The calculated permeability can be compared to the measured permeability, as shown in FIG. 9E.

Figure 10C:
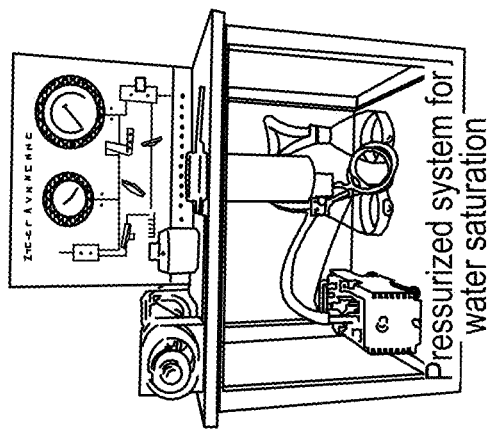
FIGS. 10A through 10C show an example MRI image intensity testing apparatus, according to various embodiments.
Figure 10B:
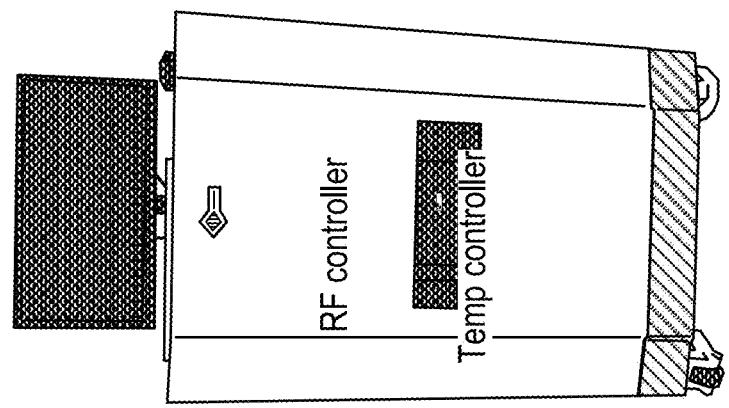
Figure 10A:
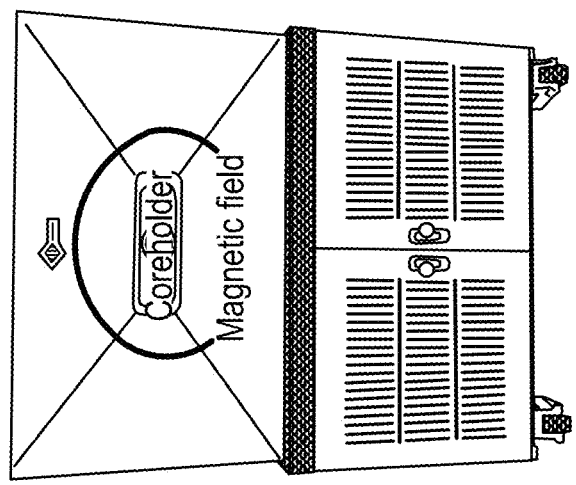

An MRI can be used as a grain radius quantifier. MRI can sense the fluid (containing hydrogen) rather than anything else. Nuclear magnetic relaxation time (T2) value differs for different pore sizes. In MRI measurement, the larger the pore, the slower the T2. Despite all the progress in NMR and MRI technology, there is not currently a direct relation between MRI Image Intensity (MRIII) and grain size with rhombohedral configuration. MRIII can be used to measure the grain size. An example, for example, the example shown in FIG. 10, can include the magnetic field with the core holder FIG. 10A, the NMR radio frequency and temperature controller FIG. 10B, and the 3-phase pressurized flooding system FIG. 10C.

Figure 11:
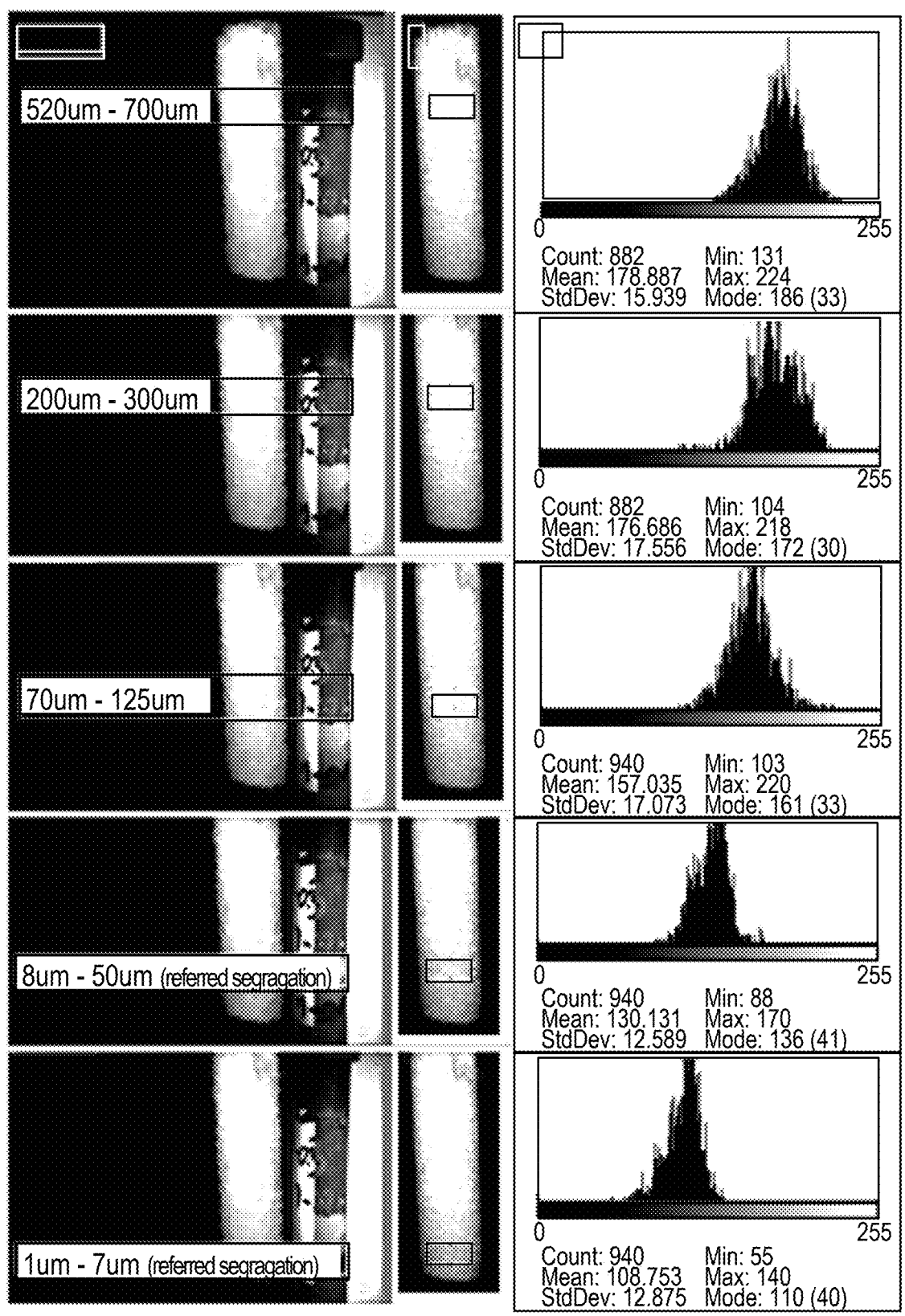
FIG. 11 shows the MRIs of 5 different sizes of glass beads, according to various embodiments.

Using glass beads of various sizes, the effect of grain size poorly sorted configuration (rhombohedral) on MRI signal can be determined. The sizes of the glass beads can be for example: 520 um-700 um, 200 um-300 um, 70 um-125 um, 8 um-50 um, and 1 um-7 um. FIG. 11 shows the MRI images for the five different sizes. The measurement results show a direct link to the grain size of the rhombohedral configuration.

Figure 13:
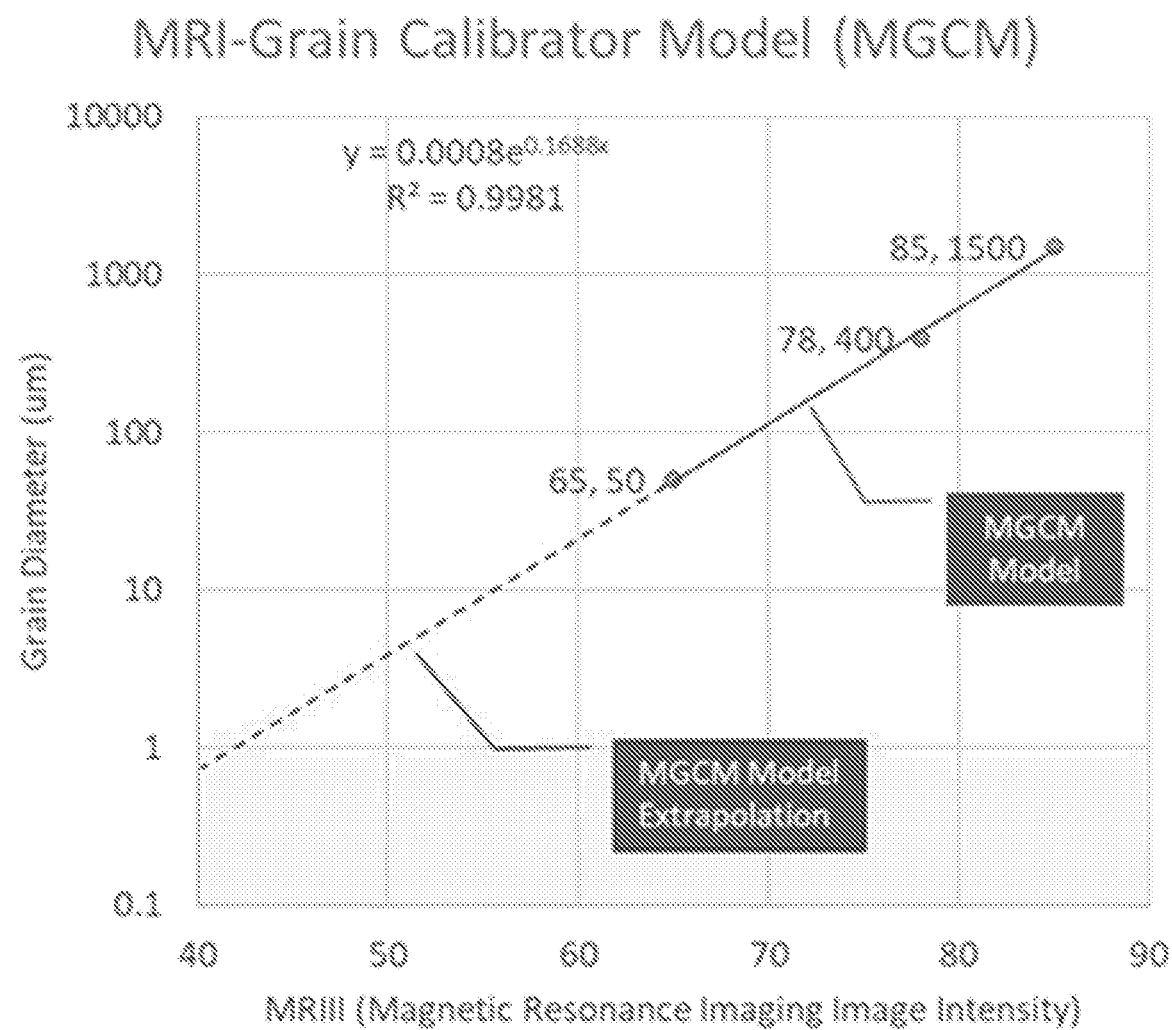
FIG. 13 shows the relation between MRI image intensity measurements and grain diameter, according to various embodiments.

As shown in FIG. 12 a narrower range of MRIII measurement (x-y axis) for three distant sizes of glass beads: 1500 um, 400 um, and 50 um can be selected. Using the refined selection of glass beads and MRIII, an MRI-Grain Calibrator Model (MGCM) can be generated. An example, MGCM model is shown in FIG. 13. FIG. 13 shows the direct relation between MRIII Image Intensity (MRIII) and Grain Diameter. The MGCM model is shown as a solid line and the extrapolation of the MGCM is shown as a dashed line.

Figure 14:
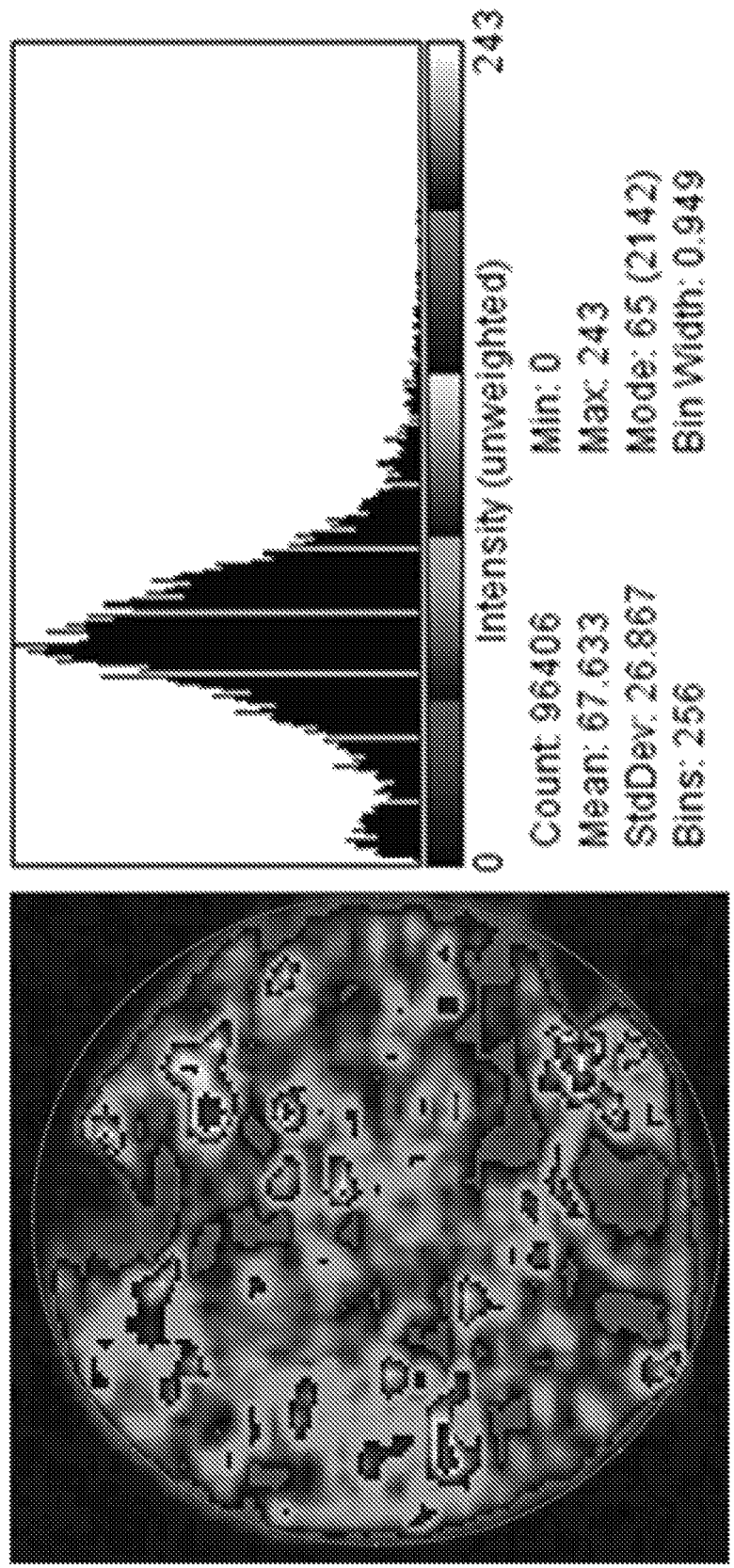
FIG. 14 shows the MRI image intensity of cretaceous carbonate rock, according to various embodiments.

FIG. 14 shows the MRIII on Cretaceous carbonate rock. the acquisition parameters of the MRI device are the same as the ones used for acquiring the MGCM calibration model. Consistency between calibration model acquisition parameters and subsequent measurements implies that if the MRI device has a different physical configuration, has different running energy, or the distance between MRI sensors and measured objects is different; then another calibration must be obtained. Therefore, for the usage of Morphology Decoder in field well drilling and planetary exploration, each calibration setup provides an MGCM chart update. The MGCM calibration models the fluid type that saturates the rock, and the fluid type surrounds our novel Permeability Imaging Logging Tool (PILT), or interchangeably called Permeability Imager, that also includes an NMR, MRI and μCT measurement devices. While for well depth measurement, a Gamma-Ray (GR) measuring device—an available tool in the market—is an additional integrated part to the PTLT. The calibration includes modeling effects of the thickness of the drilling fluid mud-cake formation on the walls of the drilled wells that affects the µCT imaging focusing. Therefore, the wellbore diameter measurement with a caliper tool and the drilling fluid composition and salinity are part of fluid and mud-cake correction for MGCM. The calibration of MGCM considers the micro-resistivity log to correct for the fluid type that saturates the rock. These two measurements (caliper and micro-resistivity)—available tools in the market—can be integrated as additional components to PTLT.

Although MGCM model values are not universal, the MGCM method processes are all universal. For the natural rock histogram, as for the MGCM model, the mean value of the histogram, for this specific rock MRIII is 67.633. This MRIII value is used with the MGCM model shown in FIG. 13, to produce a grain diameter value of 68.82 um. The grain diameter value of 68.82 um can be used with $$k_{3D_{rhombohedral}} = PorTS_{rhombohedral_{3D_{Effective}}} = 0.0858\ r_g^2$$

to calculate the $k_{3D_{rhombohedral}}$ for this natural rock sample to find the permeability to value to be 113 mD. The permeability value of 113 mD can be validated using the Morphology Decoder.

Figure 15:
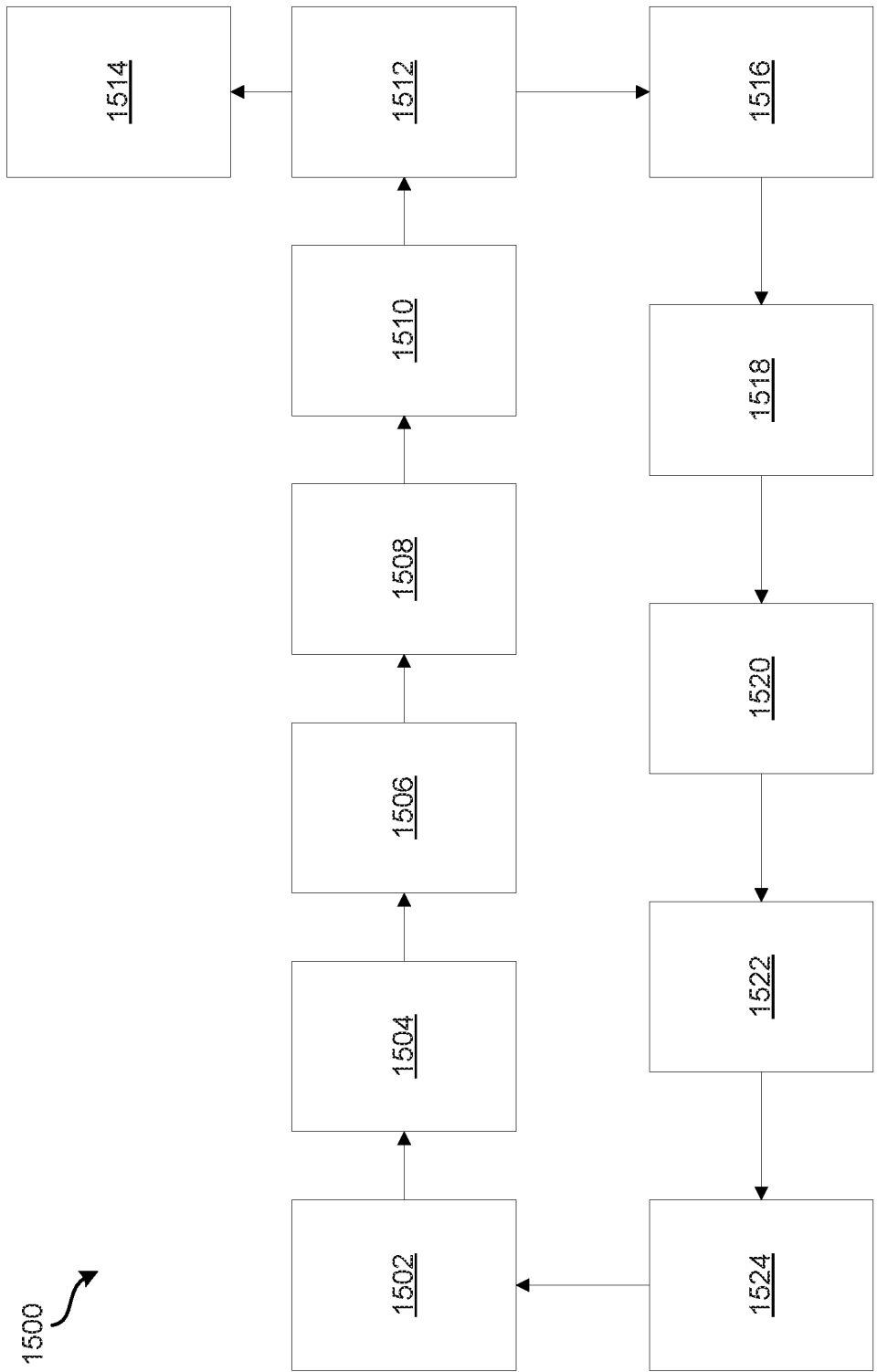
FIG. 15 shows an example process for determining and validating a controllable measurable volume, according to various embodiments.

FIG. 15 shows an example process for validation. For example, the process 1500 can start with step 1502 a 2D image slice of a Nature Object. The process 1500 at step 1504 can then include construction of a 3D image using multiple (e.g., thousands) of 2D slices. The process 1500 at 1506 can then include labeling the 3D Nature Object Morphology types. The process 1500 at step 1508 can then include Machine learning classification of morphology types. The process 1500 at step 1510 can then include 3D separation of classified morphology type. The process 1500 at step 1512 can then include CMV (controllable Measurable Volume). The process 1500 at 1514 can include recording the CMV model in a database. In various embodiments, the process 1500 at step 1516 can include determining a 2D morphology property. The process 1500 at step 1518 can then include 3D property integration model. The process 1500 at step 1520 can then include 3D morphology property. The process 1500 at step 1522 can then include validating prediction model with experiment. The process 1500 at step 1524 can then include determining model accuracy and error. The image can then be refined and used as the 2D image slice of nature object in an iterative process (e.g., start at step 1502).

Figure 16:
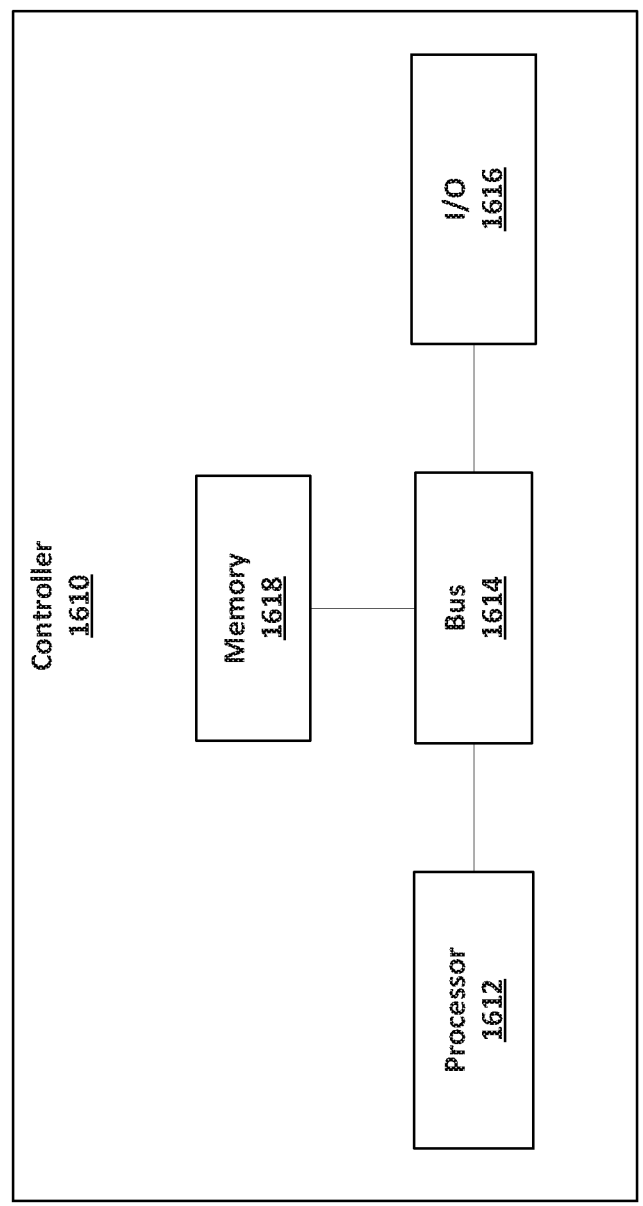
FIG. 16 illustrates an example computer system for use with example processes described herein, according to various embodiments.

FIG. 16 is an example computer system 1600 for use with the permeability determination process described herein. In some embodiments, the computer system 1600 performs one, some, or all of the steps of:
 i. Step 1: use 3D images (MRI, µCT) as inputs to the machine learning to deliver an output of 3D rock segments based autonomously on a defined labeling set.
 ii. Step 2: use the output of Step 1 as an input for the MRI Permeability Imager to deliver an output of grain size value for each rock segment.
 iii. Step 3: use the output of Step 2 as an input for 3D Geometrical Permeability to deliver an output of permeability value, $k_{3D_{rhombohedral}}$, for each segment.
 iv. Step 4: use the output of Step 3 as an input for the 3D Vision Property Integration Model for Permeability to deliver the rock 3D heterogeneous permeability, $k_{HeC}$.

However, the computer system 1600 may perform additional and/or alternative steps. In various embodiments, the computer system 1600 includes a controller 1610 that is implemented digitally and is programmable using conventional computer components. The controller 1610 may be used in connection with certain examples (e.g., including equipment and processes described herein) to carry out the processes of such examples. The controller 1610 includes a processor 1612 that can execute code stored on a tangible computer-readable medium in a memory 1618 (or elsewhere such as portable media, on a server or in the cloud among other media) to cause the controller 1610 to receive and process data and to perform actions and/or control components of equipment. The controller 1610 may be any device that can process data and execute code that is a set of instructions to perform actions such as to control industrial equipment. As non-limiting examples, the controller 1610 can take the form of a digitally implemented and/or programmable PID controller, a programmable logic controller, a microprocessor, a server, a desktop or laptop personal computer, a laptop personal computer, a handheld computing device, and a mobile device.

Examples of the processor 1612 include any desired processing circuitry, an application-specific integrated circuit (ASIC), programmable logic, a state machine, or other suitable circuitry. The processor 1612 may include one processor or any number of processors. The processor 1612 can access code stored in the memory 1618 via a bus 1614. The memory 1618 may be any non-transitory computer-readable medium configured for tangibly embodying code and can include electronic, magnetic, or optical devices. Examples of the memory 1618 include random access memory (RAM), read-only memory (ROM), flash memory, a floppy disk, compact disc, digital video device, magnetic disk, an ASIC, a configured processor, or other storage device.

Instructions can be stored in the memory 1618 or in the processor 1612 as executable code. The instructions can include processor-specific instructions generated by a compiler and/or an interpreter from code written in any suitable computer-programming language. The instructions can take the form of an application that includes a series of setpoints, parameters for detecting light, and programmed steps which, when executed by the processor 1612, allow the controller 1610 to determine if solidifying metal 114 has separated from the mold 120, such as by detecting light 152 between the mold 120 and the solidifying metal 114 using the camera 140 to capture light emitted by the light source 150. Additionally or alternatively, the instructions can include instructions for a machine vision application.

In various embodiments, the memory 1618 and/or the processor 1612 can be used for the machine learning guided image analysis (e.g., as described in FIG. 1). The memory 1618 and/or the processor 1612 can additionally or alternatively be used with computer vision to determine fluid flow and/or permeability. In further embodiments, the computer vision can be used for 3D image objects properties recognition.

The controller 1610 shown in FIG. 16 includes an input/output (I/O) interface 1616 through which the controller 1610 can communicate with devices and systems external to the controller 1610, including components such as a camera (e.g., for computer vision). The input/output (I/O) interface 1616 can also, if desired, receive input data from other external sources. Such sources can include control panels, other human/machine interfaces, computers, servers or other equipment that can, for example, send instructions and parameters to the controller 1610 to control its performance and operation; store and facilitate programming of applications that allow the controller 1610 to execute instructions in those applications to associated with various processes of certain examples of the invention; and other sources of data necessary or useful for the controller 1610 in carrying out its functions. Data can be communicated to the input/output (I/O) interface 1616 via a network, hardwire, wirelessly, via bus, or as otherwise desired.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method of determining a permeability value and generating a permeability image of a rock, the method comprising:
    determining, using 3D images, labeling corresponding to bioclast and grain size for 3D rock segments of a rock;
    determining, using the 3D rock segments and a permeability imager, a grain size value of a first 3D rock segment of the 3D rock segments;
    determining, using the determined grain size value for the first 3D rock segment and a geometrical 3D permeability model, a permeability value for the first 3D rock segment;
    determining, using the permeability value for the first 3D rock segment, a 3D heterogeneous permeability of the rock; and
    outputting the 3D heterogeneous permeability of the rock.

2. The method of claim 1, wherein at least one of the steps comprises using one or more of a 2D or 3D MRI, a μCT wireline logging tool (WL), a logging while drilling tool (LWD), a logging while coring (LWC) tool, or a robot carrying sensors.

3. The method of claim 1, wherein determining the labeling comprises using a geological labeling reference that can autonomously segment, segregate and label the rock segments.

4. The method of claim 1, wherein the permeability imager is refined with an MRI image intensity (MRIII) calibrator that receives known grain size references filled with crude oil.

5. The method of claim 1, wherein the geometrical 3D permeability model enables quantifying natural rock permeability for grain sizes of rhombohedral structural configuration.

6. The method of claim 1, wherein determining the 3D heterogeneous permeability of the rock comprises using an aggregation process for 3D porous media vision using parallel and serial permeability equations to produce the 3D heterogeneous permeability of the rock.

7. A computer system comprising;
    a memory; and
    a processor, the processor configured to:
        determine, using 3D images, labeling corresponding to bioclast and grain size for 3D rock segments of a rock;
        determine, using the 3D rock segments and a permeability imager, a grain size value of a first 3D rock segment of the 3D rock segments;

determine, using the determined grain size value for the first 3D rock segment and a geometrical 3D permeability model, a permeability value for the first 3D rock segment;

determine, using the permeability value for the first 3D rock segment, a 3D heterogeneous permeability of the rock; and output the 3D heterogeneous permeability of the rock.

8. The computer system of claim 7, wherein the processor is further configured to determine port throat sizes of the 3D rock segment and determining the permeability model based on the determined port throat sizes.

9. The computer system of claim 7, wherein the rock comprises cretaceous carbonate.

10. The computer system of claim 7, wherein the processor is further configured to update the geometrical 3D permeability model based on a comparing of the determined permeability value with a calculated permeability value of the rock.

11. The computer system of claim 7, wherein the geometrical 3D permeability model comprises a glass beads 3D micro model or a printed mesh 3D micro model.

12. The computer system of claim 7, wherein the processor is further configured to generate the 3D image using a plurality of 2D images.

13. The computer system of claim 7, wherein the rock comprises spherical grains positioned in a cubic configuration.

14. The computer system of claim 7, wherein determining the 3D heterogeneous permeability of the rock comprises using an aggregation process for 3D porous media vision using parallel and serial permeability equations to produce the 3D heterogeneous permeability of the rock.

15. The computer system of claim 7, wherein the processor is further configured to access a database comprising geometrical 3D permeability models for a plurality of rock types.

* * * * *